(12) United States Patent
Kennedy et al.

(10) Patent No.: US 11,035,983 B2
(45) Date of Patent: Jun. 15, 2021

(54) CAST-MOLDABLE, HIGH REFRACTIVE INDEX, RIGID, GAS PERMEABLE POLYMER FORMULATIONS FOR AN ACCOMMODATING CONTACT LENS

(71) Applicant: Verily Life Sciences LLC, Mountain View, CA (US)

(72) Inventors: Scott Kennedy, Mountain View, CA (US); Jeffrey George Linhardt, San Francisco, CA (US); Angela DiCiccio, Mountain View, CA (US)

(73) Assignee: VERILY LIFE SCIENCES LLC, South San Francisco, CA (US)

( * ) Notice: Subject to any disclaimer, the term of this patent is extended or adjusted under 35 U.S.C. 154(b) by 201 days.

(21) Appl. No.: 15/714,964

(22) Filed: Sep. 25, 2017

(65) Prior Publication Data
US 2018/0088352 A1    Mar. 29, 2018

Related U.S. Application Data

(60) Provisional application No. 62/399,593, filed on Sep. 26, 2016.

(51) Int. Cl.
*G02B 1/04*       (2006.01)
*G02C 7/04*       (2006.01)
(Continued)

(52) U.S. Cl.
CPC ........ *G02B 1/043* (2013.01); *B29D 11/00076* (2013.01); *B29D 11/00134* (2013.01);
(Continued)

(58) Field of Classification Search
CPC . G02C 7/04–7/085; C08L 33/00–33/26; C08F 283/12–283/128;
(Continued)

(56) References Cited

U.S. PATENT DOCUMENTS 3,808,178 A * 4/1974 Gaylord ............... C08F 220/12
                                                          526/279
4,540,761 A * 9/1985 Kawamura ............ G02B 1/04
                                                          351/159.33
(Continued)

FOREIGN PATENT DOCUMENTS

JP         S5919918 A      2/1984
JP         S61156227 A     7/1986
(Continued)

OTHER PUBLICATIONS

Syed et al. "Novel switching mode in a vertically aligned liquid crystal contact lens". Optics Express, vol. 23, No. 8, (2015); pp. 9911-9916.*

(Continued)

*Primary Examiner* — Prashant J Khatri
(74) *Attorney, Agent, or Firm* — Christensen O'Connor Johnson Kindness PLLC

(57) ABSTRACT

An eye-mountable device is provided that includes a plurality of rigid polymer layers separated by liquid crystal layers. Certain eye-mountable devices includes a first rigid polymer layer, a second rigid polymer layer, and a liquid crystal layer between the first and second rigid polymer layers. The liquid crystal layer has a refractive index that is electrically controllable between an ordinary refractive index and an extraordinary refractive index, and the first rigid polymer layer and second rigid polymer layer include materials having a refractive index similar to the ordinary refractive index of the liquid crystal layer. The first rigid polymer layer and second rigid polymer layer may also include a combination of monomer-derived units that provide cast-moldable materials with high oxygen permeability. Methods for fabricating the eye-mountable device and for (Continued)

changing the focal length of the eye-mountable device are also provided.

14 Claims, 11 Drawing Sheets

(51) Int. Cl.
*G02C 7/08* (2006.01)
*B29D 11/00* (2006.01)
*B32B 7/023* (2019.01)
*B29K 105/00* (2006.01)

(52) U.S. Cl.
CPC ............... *B32B 7/023* (2019.01); *G02C 7/04* (2013.01); *G02C 7/049* (2013.01); *G02C 7/083* (2013.01); *B29K 2105/0079* (2013.01); *B29K 2995/0031* (2013.01); *B29K 2995/0065* (2013.01); *G02C 2202/16* (2013.01); *G02C 2202/18* (2013.01); *G02C 2202/20* (2013.01)

(58) Field of Classification Search
CPC ......... C08F 220/18–220/1818; C08F 214/182; G02B 1/043; B32B 7/023
See application file for complete search history.

(56) References Cited

U.S. PATENT DOCUMENTS

| | | | | |
|---|---|---|---|---|
| 4,780,515 A * | 10/1988 | Deichert | ............... | C08F 220/22 523/107 |
| 4,810,764 A * | 3/1989 | Friends | .................. | C08F 30/08 526/245 |
| 5,162,469 A * | 11/1992 | Chen | .................. | C08F 214/186 351/159.33 |
| 5,194,556 A * | 3/1993 | Mueller | ............. | C08F 290/068 528/28 |
| 5,196,493 A * | 3/1993 | Gruber | ................. | C08F 220/22 526/245 |
| 5,314,961 A | 5/1994 | Anton et al. | | |
| 5,986,001 A | 11/1999 | Ingenito et al. | | |
| 2007/0225399 A1 * | 9/2007 | Lowery | .................. | G02B 1/043 523/113 |
| 2012/0212696 A1 * | 8/2012 | Trajkovska | ............ | G02C 7/083 349/123 |
| 2012/0245444 A1 | 9/2012 | Otis et al. | | |
| 2015/0077661 A1 | 3/2015 | Pugh et al. | | |
| 2015/0138454 A1 * | 5/2015 | Pugh | ........................ | G02C 7/04 349/13 |
| 2015/0362752 A1 | 12/2015 | Linhardt et al. | | |
| 2015/0362754 A1 | 12/2015 | Etzkorn et al. | | |
| 2016/0170097 A1 * | 6/2016 | Milton | ..................... | G02B 3/14 349/13 |

FOREIGN PATENT DOCUMENTS

| | | | |
|---|---|---|---|
| JP | H03223321 A | | 10/1991 |
| JP | H08508826 T | | 9/1996 |
| JP | 2009151140 A | | 7/2009 |
| JP | 2009251067 A | | 10/2009 |
| WO | WO-2015015205 A1 | * | 2/2015 |

OTHER PUBLICATIONS

Tranoudis et al. "Refractive Index of Rigid Contact Lens Materials", Contact Lens and Anterior Eye, vol. 21, No. 1, (1998); pp. 15-18.*
Examination Report No. 1, dated Sep. 3, 2019, for Australian Patent Application No. 2017332807. (3 pages).
PCT/US2017/053546—International Search Report and Written Opinion of the International Searching Authority, dated Dec. 20, 2017, 13 pages.
Milton, H. et al., "Electronic Liquid Crystal Contact Lenses for the Correction of Presbyopia", Optics Express, vol. 22, No. 7, Apr. 7, 2014, 6 pages.
Examination Report No. 2, dated Dec. 4, 2019, for Australian Patent Application No. 2017332807. (4 pages).
Official Action of the Substantive Examination and Search Report, dated Dec. 13, 2019, for Russian Patent Application No. 2019112734/28. (with English translation, 15 pages).
Communication Pursuant to Article 94(3) EPC, dated Jan. 31, 2020, for European Patent Application No. 17787065.6. (3 pages).
Notice of Reasons for Rejection, dated Mar. 31, 2020, for Japanese Patent Application No. 2019-515254. (with English translation, 7 pages).
Examination Report dated Mar. 29, 2021, in corresponding Indian Patent Application No. 201947013128, 6 pages.

* cited by examiner

| Formulation | mgs | microliters | microliters | microliters | microliters | microliters | microliters | microliters | mgs | Softening Point |
|---|---|---|---|---|---|---|---|---|---|---|
| | BPA-DM | DMS-R11 | HF-MA | TRIS-MA | MMA | M1142 | Phenyl-MA | DC-1173 | AIBN | |
| K3 | 150 | 280 | 500 | 350 | 200 | 600 | -- | 20 | -- | ~70 °C |
| K6 | 150 | 140 | 500 | 490 | 200 | 600 | -- | 20 | -- | ~70 °C |
| K7 | 150 | 0 | 500 | 630 | 200 | 600 | -- | 20 | -- | ~70 °C |
| K8 | 150 | 140 | 500 | 490 | 200 | 600 | -- | -- | 20 | N/A |
| K9 | 150 | 0 | 500 | 630 | 200 | 600 | -- | -- | 20 | N/A |
| K10 | 150 | 0 | 500 | 630 | 200 | 0 | 600 | 20 | -- | ~90 °C |
| K11 | 200 | 0 | 500 | 630 | 200 | 0 | 550 | 20 | -- | ~90 °C |

*FIG. 7*

| Deflection Temp | 60 °C | 65 °C | 70 °C | 75 °C | 80 °C | 85 °C | 90 °C |
|---|---|---|---|---|---|---|---|
| K3 | Soft | Soft | Soft | Soft | Soft | Soft | Soft |
| K10 | Rigid | Rigid | Rigid | Rigid | Start Softening | Soft | Soft |
| K13 | Rigid | Rigid | Rigid | Rigid | Rigid | Start Softening | Soft |
| K15 | Rigid | Rigid | Rigid | Rigid | Rigid | Start Softening | Soft |
| K17 | Rigid | Rigid | Rigid | Rigid | Rigid | Start Softening | Soft |
| Polyurethane | Rigid | Rigid | Rigid | Rigid | Start Softening | Start Softening | Soft |

*FIG. 9*

CAST-MOLDABLE, HIGH REFRACTIVE INDEX, RIGID, GAS PERMEABLE POLYMER FORMULATIONS FOR AN ACCOMMODATING CONTACT LENS

CROSS-REFERENCE TO RELATED APPLICATION

This application claims the benefit of U.S. patent application Ser. No. 62/399,593, filed Sep. 26, 2016, the disclosure of which is hereby incorporated by reference in its entirety.

BACKGROUND

Unless otherwise indicated herein, the materials described in this section are not prior art to the claims in this application and are not admitted to be prior art by inclusion in this section.

Accommodation is a process by which the eye adjusts its focal distance to maintain focus on objects of varying distance. Accommodation is a reflex action controlled by contractions of the ciliary muscle, but can be consciously manipulated. The ciliary muscle encircles the eye's elastic lens and applies a force on the elastic lens during muscle contractions that change the focal point of the elastic lens.

As an individual ages, the effectiveness of the ciliary muscle degrades. Presbyopia is a progressive age-related loss of accommodative or focusing strength of the eye, which results in increased blur at near distances. This loss of accommodative strength with age has been well studied and is relatively consistent and predictable. Presbyopia affects nearly 1.7 billion people worldwide today (110 million in the United States alone) and that number is expected to substantially rise as the world's population ages. Techniques and devices that can help individuals offset the effects of presbyopia are increasingly in demand.

For example, the effects of presbyopia can be mitigated by an accommodating contact lens that includes an accommodation actuator for controlling the focal length of the accommodating contact lens. To build such an accommodating contact lens, it is desirable to use materials that satisfy specific technical criteria, including (1) mechanical and (2) permeability properties similar to traditional rigid, gas permeable (RGP) contact lens materials, (3) a customizable refractive index (RI) complimentary to the accommodation modality, (4) an ability to be precisely cast-molded, and (5) temperature stability to allow for further processing, including the application of additional coatings, such as the transparent conductive layers and liquid crystal alignment layers. Conventional contact lens materials that are currently on the market do not meet all four of these technical criteria.

Cast-moldable materials exist, such as polyurethanes, that have a customizable RI and appropriate mechanical properties, but these materials are insufficiently permeable to oxygen to be useful in eye-mounted applications. High RI, RGP materials exist as specialty materials, but these materials are typically molded in a rod shape and cut down to "buttons" which are then lathed into a contact lens form factor. This manufacturing process works for prescription RGP contact lenses, but is not practical for high volume accommodating contact lens manufacturing, and the existing specialty materials cannot be cast molded in a way that enables successful manufacturing of the accommodating lens.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure provides an eye-mountable device including a first rigid polymer layer, a second rigid polymer layer and a liquid crystal layer between the first and second rigid polymer layers. The first rigid polymer layer has a first-layer refractive index, the second rigid polymer layer has a second-layer refractive index, and the liquid crystal layer has an ordinary refractive index and an extraordinary refractive index that differ by more than 0.1. In some embodiments, the first-layer refractive index and the ordinary refractive index differ by less than 0.01, and in other embodiments, the first-layer refractive index and the extraordinary refractive index differ by less than 0.01. The first rigid polymer layer and second rigid polymer layer may also include cast-moldable materials with clinically acceptable oxygen permeability, defined herein as cast moldable materials with oxygen permeability of 100 Dk or greater. Such oxygen permeability provides sufficient oxygen transmissibility to the cornea to avoid indications such as hypoxia and anoxia.

The materials may include a combination of monomer-derived units that provide the appropriate chemical and mechanical properties for an accommodating eye-mountable device. The monomer-derived units may include one or more di(meth)acrylate-derived units and one or more (meth) acrylate-derived units. The device may further include an electric circuit.

In another aspect, the present disclosure provides a method for fabricating an eye-mountable device. The method involves forming a first monomer solution; curing the first monomer solution to provide the first rigid polymer layer; forming a second monomer solution; curing the second monomer solution to provide the second rigid polymer layer; and providing the liquid crystal layer between the first rigid polymer layer and second rigid polymer layer.

In another aspect, the invention provides a method for changing the focal length of the eye-mountable device. The method involves switching the liquid crystal layer from the ordinary refractive index to the extraordinary refractive index, wherein the first-layer refractive index differs from either the ordinary refractive index or the extraordinary refractive index by less than 0.01. In another embodiment, the method involves switching the liquid crystal layer from the extraordinary refractive index to the ordinary refractive index, wherein the first-layer refractive index differs from either the ordinary refractive index or the extraordinary refractive index by less than 0.01.

These as well as other aspects, advantages, and alternatives, will become apparent to those of ordinary skill in the art by reading the following detailed description, with reference where appropriate to the accompanying drawings.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 7 is a table summarizing the composition and softening point of exemplary rigid polymers layer materials in accordance with embodiments disclosed herein.

FIG. 9 is a table summarizing data characterizing exemplary and comparative lens materials with regard to softening in relation to temperature.

DETAILED DESCRIPTION

Figure 1A:
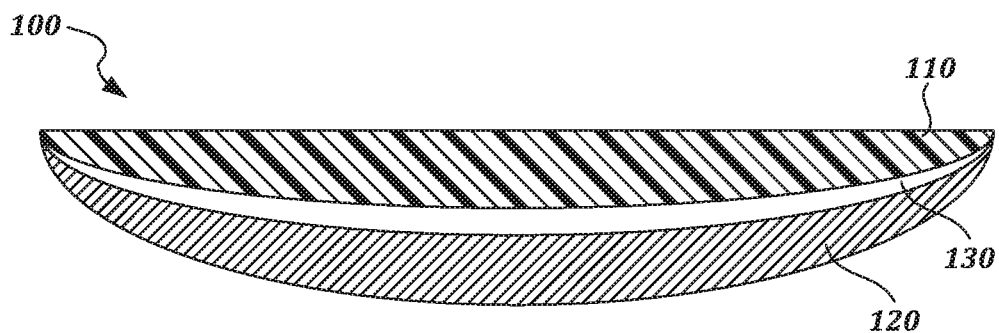
FIG. 1A is a diagram illustrating an eye-mountable device in accordance with embodiments disclosed herein.

While illustrative embodiments have been illustrated and described, it will be appreciated that various changes can be made therein without departing from the spirit and scope of the invention.

The following detailed description describes various features and functions of the disclosed methods, apparatus, and systems with reference to the accompanying FIGURES. In the FIGURES, similar symbols typically identify similar components, unless context dictates otherwise. The illustrative method, apparatus, and system embodiments described herein are not meant to be limiting. It will be readily understood that certain aspects of the disclosed methods, apparatus, and systems can be arranged and combined in a wide variety of different configurations, all of which are contemplated herein.

As used herein, the term "alkyl" includes alkyl, alkenyl and alkynyl groups of a designed number of carbon atoms, such as 1 to 12 carbons (i.e., inclusive of 1 and 12), 1 to 6 carbons, 1 to 3 carbons, or 1, 2, 3, 4, 5, 6, 7, 8, 9, 10, 11 or 12 carbons. The term "$C_m$-$C_n$alkyl" means an alkyl group having from m to n carbon atoms (i.e., inclusive of m and n). The term "$C_m$-$C_n$alkenyl" means an alkenyl group having from m to n carbon atoms. For example, "$C_1$-$C_6$alkenyl" is an alkenyl group having from one to six carbon atoms. Alkyl and alkenyl groups may be straight or branched and depending on context, may be a monovalent radical or a divalent radical (i.e., an alkylene group). In the case of an alkyl or alkenyl group having zero carbon atoms (i.e., "$C_0$alkyl"), the group is simply a single covalent bond if it is a divalent radical or is a hydrogen atom if it is a monovalent radical. For example, the moiety "—($C_0$-$C_6$alkyl)—Ar" signifies connection of an optionally substituted aryl through a single bond or an alkylene bridge having from 1 to 6 carbons. Examples of "alkyl" include, for example, methyl, ethyl, propyl, isopropyl, butyl, iso-, sec- and tert-butyl, pentyl, hexyl, heptyl, 3-ethylbutyl, 3-hexenyl and propargyl. If the number of carbon atoms is not specified, the subject "alkyl" moiety has from 1 to 12 carbons.

The term "alkoxy" as used herein, means an alkyl group, as defined herein, appended to the parent molecular moiety through an oxygen atom. Representative examples of alkoxy include, but are not limited to, methoxy, ethoxy, propoxy, 2-propoxy, butoxy, tert-butoxy, pentyloxy, and hexyloxy.

The term "halogen" as used herein, means —Cl, —Br, —I or —F.

The term "haloalkyl" as used herein, means at least one halogen, as defined herein, appended to the parent molecular moiety through an alkyl group, as defined herein. Representative examples of haloalkyl include, but are not limited to, chloromethyl, 2-fluoroethyl, trifluoromethyl, pentafluoroethyl, and 2-chloro-3-fluoropentyl.

The term "haloalkoxyl" as used herein, means at least one halogen, as defined herein, appended to the parent molecular moiety through an alkoxy group, as defined herein. Representative examples of haloalkoxyl include, but are not limited to, chloromethoxy, 2-fluoroethoxy, trifluoromethoxy, pentafluoroethoxy, and 2-chloro-3-fluoropentoxy.

As used herein, any recitation of "(meth)acrylate" includes acrylate and methacrylate. For example, a di(meth) acrylate-derived monomeric unit may be an diacrylate-derived monomeric unit or a dimethacrylate-derived monomeric unit.

In one aspect, the present disclosure provides an eye-mountable device including
a first rigid polymer layer having a first-layer refractive index;
a second rigid polymer layer having a second-layer refractive index; and
a liquid crystal layer between the first and second rigid polymer layers, wherein the liquid crystal layer has a an ordinary refractive index and an extraordinary refractive index,
wherein
the first-layer refractive index and the second-layer refractive index differ by less than 0.01,
the ordinary refractive index and the extraordinary refractive index differ by more than 0.1, and
the first-layer refractive index differs from either the ordinary refractive index or the extraordinary refractive index by less than 0.01.

The eye-mountable device will now be described in more detail, with particular reference to the first rigid polymer layer and the second rigid polymer layer. However, it should be appreciated that further embodiments disclosed herein incorporate additional rigid polymer layers (e.g., a third rigid polymer layer, as illustrated in FIG. 1E). Accordingly, unless indicated otherwise, the descriptions of the embodiments of the first rigid polymer and the second rigid polymer are equally applicable to additional rigid polymer layers, including the third rigid polymer layer. The term "rigid polymer layers" refers to two or more rigid polymer layers and the term "rigid polymer layer" refers to any one rigid polymer layer within an eye-mountable device.

The first rigid polymer layer and second rigid polymer layer include materials having a refractive index that is tunable based on the composition of the polymers used to form the rigid polymer layers. For example, the first-layer refractive index or second-layer refractive index can be selected by manipulating the type and quantity of monomers used in making the first rigid polymer layer and second rigid polymer layer.

In particular, eye-mountable devices as disclosed herein incorporate one, two, or more layers of liquid crystal, and the properties of the rigid polymer layers are selected, or tailored, to match the properties of the liquid crystal layer(s). Given the variations in liquid crystal materials presently available and those that may be developed in the future, the ability to tailor the properties of the rigid polymer layers is important to the development of eye-mountable devices. The refractive indices of the rigid polymer layers and liquid crystal materials (which have two different refractive indices: ordinary and extraordinary) are particularly important to operation of the eye-mountable devices and therefor aspects herein disclose polymeric materials that can be formed into rigid polymer layers having a target refractive index in addition to other properties (e.g., being cast moldable and/or having a particular oxygen permeability). Embodiments of polymeric materials satisfying these design criteria will now be described in greater detail.

The monomer-derived units of the first and second rigid polymer layer may include one or more di(meth)acrylate-derived units and one or more (meth)acrylate-derived units.

The one or more di(meth)acrylate-derived monomeric unit may include any dimethacrylate-derived unit that is capable of forming cross-links between different backbone chains of the first or second rigid polymer layer. The di(meth)acrylate-derived monomeric unit may be derived from a di(meth)acrylate having two (meth)acrylate groups covalently bound through a linker. The linker may be hydrophilic or hydrophobic. Hydrophilic linkers may include at least one hydrophilic functional group, which include, but are not limited to, hydroxy, carboxylic acid, carboxylic salt, amine, amide and alkylene oxide functionalities. For example, the hydrophilic di(meth)acrylate may be poly(ethylene glycol) dimethacrylate. Hydrophobic linkers do not include a hydrophilic functional group, and are thus mostly limited to carbon and hydrogen atoms. For example, the hydrophobic di(meth)acrylate may be bisphenol A dimethacrylate (BPA-DM) or neopentyl glycol dimethacrylate.

In other embodiments, the di(meth)acrylate-derived monomeric unit may be polydimethylsiloxane-containing di(meth)acrylate-derived monomeric unit derived from a polydimethylsiloxane-containing di(meth)acrylate. The polydimethylsiloxane-containing di(meth)acrylate may have a linker substituted with at least one dimethylsiloxane group (—Si($R_2$)—O—), where each R is independently selected from alkyl, —($C_0$-$C_6$alkyl)—Ar, haloalkyl, alkoxy, haloalkoxy, halogen, —OR and —OSi$R_3$. The di(meth)acrylate portion of the polydimethylsiloxane-containing di(meth)acrylate may be any di(meth)acrylate defined herein where at least one bond is replaced with —Si($R_2$)—O—. For example, the polydimethylsiloxane-containing di(meth)acrylate may be methacryloxypropyl terminated polydimethylsiloxane. In some embodiments, the polydimethylsiloxane-containing di(meth)acrylate-derived monomeric unit is derived from methacryloxypropyl terminated polydimethylsiloxane 8-14 cSt.

The di(meth)acrylate-derived monomeric unit may be present as 10 weight percent to 35 weight percent of the first or second rigid polymer layer. In some embodiments, the di(meth)acrylate-derived monomeric unit may be present as 10 weight percent to 30 weight percent, 10 weight percent to 25 weight percent, 10 weight percent to 20 weight percent, 10 weight percent to 15 weight percent, 15 weight percent to 35 weight percent, 15 weight percent to 30 weight percent, 15 weight percent to 25 weight percent, 15 weight percent to 20 weight percent, 20 weight percent to 35 weight percent, 20 weight percent to 30 weight percent, 20 weight percent to 25 weight percent, 25 weight percent to 35 weight percent or 30 weight percent to 35 weight percent of the first or second rigid polymer layer. In some embodiments, the di(meth)acrylate-derived monomeric unit may be present as 5 weight percent to 10 weight percent of the first or second rigid polymer layer. In some embodiments, the polydimethylsiloxane-containing di(meth)acrylate-derived monomeric unit may be present as 10 weight percent to 20 weight percent of the first or second rigid polymer layer.

The one or more (meth)acrylate-derived monomeric units may be selected from an alkyl (meth)acrylate-derived monomeric unit, a fluorinated methacrylate-derived monomeric unit and a silicon-containing methacrylate-derived monomeric unit. In some embodiments, the one or more (meth)acrylate-derived monomeric units include an alkyl methacrylate-derived monomeric unit and an alkylene oxide (meth)acrylate-derived monomeric unit. In other embodiments, the one or more (meth)acrylate-derived monomeric units comprise an alkyl methacrylate-derived monomeric unit, an alkylene oxide (meth)acrylate-derived monomeric unit and a fluorinated methacrylate-derived monomeric unit. In other embodiments, the one or more (meth)acrylate-derived monomeric units include an alkyl methacrylate-derived monomeric unit, an alkylene oxide (meth)acrylate-derived monomeric unit, a fluorinated methacrylate-derived monomeric unit and a silicon-containing methacrylate-derived monomeric unit.

The (meth)acrylate-derived monomeric unit may be derived from an alkyl (meth)acrylate. The alkyl (meth)acrylate may include an alkyl group having 1 to 4 carbon atoms per group, for example, methyl methacrylate (MMA), ethyl methacrylate, propyl methacrylate, iso-propyl methacrylate, iso-butyl methacrylate, sec-butyl methacrylate, methyl acrylate, ethyl acrylate, propyl acrylate, iso-propyl acrylate, iso-butyl acrylate and sec-butyl acrylate. In some embodiments, the (meth)acrylate-derived monomeric unit is derived from methyl methacrylate.

In other embodiments, the (meth)acrylate-derived monomeric unit may be derived from a carbocyclic (meth)acrylate. The carbocyclic (meth)acrylate may include a cycloalkyl or aryl group having 3 to 10 carbon atoms per group, where the cycloalkyl or aryl group are optionally substituted with an alkyl group. For example, the carbocyclic may be cyclohexyl methacrylate, tert-butyl cyclohexyl methacrylate, phenyl methacrylate (Phenyl-MA) or naphthyl methacrylate.

In other embodiments, the (meth)acrylate-derived monomeric unit may be derived from a alkyl-carbocyclic (meth)acrylate. The alkyl-carbocyclic (meth)acrylate may include an alkyl group having 1 to 4 carbon atoms and a cycloalkyl or aryl group having 3 to 10 carbon atoms per group, where the cycloalkyl or aryl group are optionally substituted with an alkyl group. For example, the alkyl-carbocyclic (meth)acrylate may be benzyl methacrylate.

The alkylene oxide (meth)acrylate-derived monomeric unit may be derived from a alkylene oxide-containing (meth)acrylate. The alkylene oxide group may be a single alkylene oxide group (e.g., —$CH_2CH_2$—O—), or a poly (alkylene oxide) (e.g., poly(ethylene oxide). In some embodiments, the alkylene oxide group has the formula (—($CH_2)_n$—O—)$_m$, where n is 2, 3 or 4, and m is 0, 1, 2, 3, 4, 5, 6, 7, 8, 9 or 10. In other embodiments, m is such that the number average molecular weight ($M_n$) of the alkylene oxide group (—($CH_2)_n$—O—)$_m$ is 100 to 10,000. The alkylene oxide-containing (meth)acrylate may be capped or uncapped. For example, the uncapped alkylene oxide-containing (meth)acrylate may be poly(ethylene glycol) methacrylate, where the corresponding capped alkylene oxide-containing (meth)acrylate may be poly(ethylene glycol) methyl ether methacrylate. Examples of poly(ethylene glycol) (meth)acrylates include poly(ethylene glycol) methacrylate, poly(ethylene glycol) methyl ether methacrylate, poly(ethylene glycol) acrylate, poly(ethylene glycol) methyl ether acrylate, o-phenylphenol ethyl acrylate and hydroxyethyl propyl methacrylate. In some embodiments, the alkylene oxide (meth)acrylate-derived monomeric unit is derived from o-phenylphenol ethyl acrylate.

In some embodiments, the fluorinated (meth)acrylate monomeric unit may be derived from a (meth)acrylate containing at least one fluorine atom. For example, the fluorinated(meth)acrylate monomeric unit may be derived from 2,2,3,3,4,4,5,5,6,6,7,7-Dodecafluoroheptyl acrylate, 3,3,4,4,5,5,6,6,7,7,8,8,9,9,10,10,11,11,12,12,12-Heneicosafluorododecyl acrylate, 3,3,4,4,5,5,6,6,7,7,8,8,9,9,10,10,10-Heptadecafluorodecyl methacrylate, 2,2,3,3,4,4,4-Heptafluorobutyl acrylate, 2,2,3,3,4,4,4-Heptafluorobutyl methacrylate, 2,2,3,3,4,4,4-Hexafluorobutyl acrylate, 2,2,3,4,4,4-Hexafluorobutyl methacrylate, 1,1,1,3,3,3-Hexafluoroisopropyl acrylate, 1,1,1,3,3,3-Hexafluoroisopropyl methacrylate (HF-MA), 2,2,3,3,4,4,5,5-Octafluoropentyl acrylate, 2,2,3,3,4,4,5,5-Octafluoropentyl methacrylate, 2,2,3,3,3-Pentafluoropropyl acrylate, 2,2,3,3,3-Pentafluoropropyl methacrylate, 1H,1H,2H,2H-Perfluorodecyl acrylate, 2,2,3,3-Tetrafluoropropyl methacrylate, 3,3,4,4,5,5,6,6,7,7,8,8,8-Tridecafluorooctyl acrylate, 3,3,4,4,5,5,6,6,7,7,8,8,8-Tridecafluorooctyl methacrylate, 2,2,2-Trifluoroethyl methacrylate, 1,1,1-Trifluoro-2-(trifluoromethyl)-2-hydroxy-4-methyl-5-pentyl methacrylate or 2-[(1',1',1'-Trifluoro-2'-(trifluoromethyl)-2'-hydroxy)propyl]-3-norbornyl methacrylate. In some embodiments, the fluorinated (meth) acrylate monomeric unit is derived from 1,1,1,3,3,3-Hexafluoroisopropyl methacrylate.

In some embodiments, the silicon-containing (meth)acrylate-derived monomeric unit may be derived from a silicon-containing (meth)acrylate including a (meth)acrylate substituted with at least one silicon atom (—SiR$_3$). The silicon atom may be substituted with three R groups, where each R is independently selected from alkyl, —(C$_0$-C$_6$alkyl)—Ar, haloalkyl, alkoxy, haloalkoxy, halogen, —OR and —OSiR$_3$. The (meth)acrylate portion of the silicon-containing (meth) acrylate may be any (meth)acrylate defined herein where at least one hydrogen atom is replaced with —SiR$_3$. For example, the silicon-containing (meth)acrylate-derived monomeric unit may be derived from 3-[Tris(trimethylsiloxy)silyl]propyl methacrylate (TRIS-MA), 3-(Trimethoxysilyl)propyl methacrylate, (Trimethylsilyl)methacrylate and Tributylsilyl methacrylate. In some embodiments, the silicon-containing (meth)acrylate-derived monomeric unit is derived from 3-[Tris(trimethylsiloxy)silyl]propyl methacrylate.

In some embodiments, the first or second rigid polymer layer includes 15 weight percent to 30 weight percent of one or more di(meth)acrylate-derived monomeric unit and 60 weight percent to 85 weight percent of one or more (meth) acrylate-derived monomeric units.

In some embodiments, the first or second rigid polymer layer includes 15 weight percent to 30 weight percent of one or more di(meth)acrylate-derived monomeric unit, 40 weight percent to 55 weight percent of one or more (meth) acrylate-derived monomeric units, and 20 weight percent to 30 weight percent of one or more fluorinated (meth)acrylate-derived monomeric units.

In some embodiments, the first or second rigid polymer layer includes 15 weight percent to 30 weight percent of one or more di(meth)acrylate-derived monomeric unit, 15 weight percent to 25 weight percent of one or more methacrylate-derived monomeric units, 25 weight percent to 30 weight percent of one or more acrylate-derived monomeric units, and 20 weight percent to 30 weight percent of one or more fluorinated (meth)acrylate-derived monomeric units.

In some embodiments, the first or second rigid polymer layer includes 15 weight percent to 30 weight percent of one or more di(meth)acrylate-derived monomeric unit, 5 weight percent to 15 weight percent of one or more alkyl methacrylate-derived monomeric units, 10 weight percent to 20 weight percent of one or more silicon-containing methacrylate-derived monomeric units, 25 weight percent to 30 weight percent of one or more acrylate-derived monomeric units and 20 weight percent to 30 weight percent of one or more fluorinated (meth)acrylate-derived monomeric units.

In some embodiments, the first or second rigid polymer layer includes 5 weight percent to 10 weight percent of a monomeric unit derived from Bisphenol A dimethacrylate, 10 weight percent to 20 weight percent of a monomeric unit derived from methacryloxypropyl terminated polydimethylsiloxane 8-14 cSt, 20 weight percent to 30 weight percent of a monomeric unit derived from 1,1,1,3,3,3-Hexafluoroisopropyl methacrylate, 7 weight percent to 12 weight percent of a monomeric unit derived from methyl methacrylate, 10 weight percent to 20 weight percent of a monomeric unit derived from 3-[Tris(trimethylsiloxy)silyl]propyl methacrylate and 27 weight percent to 33 weight percent of a monomeric unit derived from o-phenylphenol ethyl acrylate.

In some embodiments, the first rigid polymer layer and the second rigid polymer layer are the same.

In certain embodiments, at least one of the rigid polymer layers includes an additive selected from the group consisting of conventional free radical initiators, which are generally employed at 0.01 to 2% by weight; coloring agents (colorants); ultraviolet blocking compounds; and combinations thereof.

In certain embodiments, the mixture is molded in a shape that is subsequently machined into the form of a contact lens, such as rod stock, a lens button, or a lens blank containing one finished surface.

In other embodiments, the mixtures that form the rigid polymer layers are cast-molded directly in the form of a contact lens. In this regard, in certain embodiments the first rigid polymer layer and second rigid polymer layer include cast-moldable materials with high oxygen permeability. The materials may include a combination of monomer-derived units that provide the appropriate chemical and mechanical properties for an accommodating eye-mountable device. Cast-moldable materials are able to form a polymer layer through the polymerization of a polymerizable mixture in a mold (e.g., a polypropylene mold), where the resulting polymer layer can be removed from the mold without damage the polymer layer or any components contained thereon or therein.

In order to facilitate the cast-molding process, the formed rigid polymer layers have certain physical characteristics that can be defined based on hardness, toughness, modulus, and other characteristics.

In one embodiment, the rigid polymer layers have a toughness of at least 1.2 Mpa·mm, more preferably at least 1.5 Mpa·mm; a Rockwell hardness of at least 90; a Shore D hardness of at least 70; and/or a modulus of at least 800 Mpa. Toughness may be measured according to ASTM D 790M-86 on 0.5 mm disk samples. Modulus may be measured according to ASTM D-1708a, employing an Instron (Model 4502) instrument where the polymer sample is immersed in borate buffered saline; an appropriate size of the sample is gauge length 22 mm and width 4.75 mm, where the sample further has ends forming a dogbone shape to accommodate gripping of the sample with clamps of the Instron instrument, and a thickness of 200+50 microns. Rockwell hardness may be measured according to ASTM D785, employing an Rockwell hardness instrument, such as Rockwell Hardness Tester Model 3TTB (Wilson Instrument), on disk samples having a smooth, flat surface. Shore D hardness may be measured according to ASTM D2240, employing a Shore D durometer on disk samples. Preferably, for both hardness methods, the samples are preconditioned by storing the samples for at least 40 hours in a chamber with 50% controlled humidity, such as by the method of ASTM E104-85.

In one embodiment, the cast-moldable polymer layers have a Modulus of 0.8 MPa to 1.5 MPa. In some embodiments, the Modulus is 0.8 MPa to 1.1 MPa, or 0.9 MPa to 1.1 MPa, or 0.8 MPa to 1.0 MPa, or 0.9 MPa to 1.0 MPa, or 1.0 MPa to 1.1 MPa, or 1.0 MPa to 1.2 MPa.

In one embodiment, the cast-moldable polymer layers have a yield stress of 18 MPa to 22 MPa. In some embodiments, the yield stress may be 18 MPa to 21 MPa, or 18 MPa to 20 MPa, or 18 MPa to 19 MPa, or 19 MPa to 22 MPa, or 19 MPa to 21 MPa, or 19 MPa to 20 MPa, or 20 MPa to 22 MPa, or 20 MPa to 21 MPa.

In one embodiment, the cast-moldable polymer layers have a stress at break of 12 MPa to 18 MPa. In some embodiments, the stress at break may be 12 MPa to 17 MPa, or 11 MPa to 18 MPa, 12 MPa to 16 MPa, or 13 MPa to 16 MPa, or 14 MPa to 18 MPa, or 14 MPa to 16 MPa, or 16 MPa to 18 MPa, or 16 MPa to 20 MPa, or 16 MPa to 22 MPa, or 18 MPa to 22 MPa, or 18 MPa to 20 MPa, or 20 MPa to 22 MPa.

In one embodiment, the cast-moldable polymer layers have a Shore-D hardness of at least 70. In one embodiment the cast-moldable polymer layers have a Shore-D hardness of 70 to 80. In some embodiments, the Shore-D hardness may be 70 to 78, or 70 to 76, or 70 to 74, or 70 to 72, or 70 to 75, or 72 to 80, or 72 to 78, or 72 to 76, or 72 to 74, or 74 to 78, or 76 to 78, or 74 to 80, or 74 to 78, or 76 to 78, or 78 to 80, or 75 to 80.

In one embodiment, the cast-moldable polymer layers have a shrinkage of less than 20%. In one embodiment, the cast-moldable polymer layers have a shrinkage of less than 15%. In one embodiment, the cast-moldable polymer layers have a shrinkage of less than 10%. Any shrinkage experienced during the molding process may be reproducible and predictable such that the same ultimate dimensions are achieved for each of the first and second rigid polymer layers. In some embodiments, the shrinkage is predictable within less than 1%. Shrinkage can be measured using several techniques, with ASTM C531-00 as an exemplary standard test for measuring linear shrinkage. Shrinkage can be characterized by measurements in different dimensions, including diameter, thickness, and overall volume.

In one embodiment, the cast-moldable polymer layers each have a gas permeability of at least 50 Barrers (defined herein as the "clinically acceptable" gas permeability). In another embodiment, the cast-moldable polymer layers when combined in the eye-mountable device have a gas permeability of at least 50 Barrers. In another embodiment, the eye-mountable device as a whole has a gas permeability of at least 50 Barrers.

In some embodiments, the gas permeability of a cast-moldable polymer layer is from 50 Barrers to 200 Barrers, or 50 Barrers to 190 Barrers, or 50 Barrers to 180 Barrers, or 50 Barrers to 160 Barrers, or 50 Barrers to 150 Barrers, or 50 Barrers to 140 Barrers, or 50 Barrers to 130 Barrers, or 50 Barrers to 120 Barrers, or 50 Barrers to 110 Barrers, or 100 Barrers to 200 Barrers, or 100 Barrers to 190 Barrers, or 100 Barrers to 180 Barrers, or 100 Barrers to 160 Barrers, or 100 Barrers to 150 Barrers, or 100 Barrers to 140 Barrers, or 100 Barrers to 130 Barrers, or 100 Barrers to 120 Barrers, or 100 Barrers to 110 Barrers, or 110 Barrers to 130 Barrers, or 110 Barrers to 150 Barrers, or 120 Barrers to 160 Barrers, or 130 Barrers to 150, or 120 Barrers to 180 Barrers.

In some embodiments, the rigid polymer layers each have a gas permeability of at least 50 Barrers. In some embodiments, the first and second rigid polymer layers have a gas permeability of at least 100 Barrers, or at least 110 Barrers, or at least 120 Barrers, or at least 130 Barrers. In other embodiments, the first and second rigid polymer layers may have a gas permeability of 120 Barrers to 140 Barrers, or 105 Barrers to 180 Barrers, or 105 Barrers to 150 Barrers, or 105 Barrers to 125 Barrers. In some embodiments, the gas is oxygen. Gas permeability can be measured according to the techniques disclosed below.

To provide clinically acceptable oxygen permeability, in certain embodiments the eye-mountable device has an oxygen permeability of 100 Dk or greater. Accordingly, in certain embodiments, the eye-mounted device includes cast-moldable polymer layers with an oxygen permeability of 100 Dk or greater.

In another embodiment, the eye-mounted device is defined by Dk/t (oxygen transmissibility divided by all-layers device thickness). In one embodiment, to prevent hypoxia, the eye-mounted device has 24 Dk/t or greater for a daily-use device or 87 Dk/t or greater for an extended wear device. In another embodiment, to prevent anoxia, the eye-mounted device has 35 Dk/t or greater for a daily-use device or 135 Dk/t or greater for an extended wear device.

The eye-mounted device can be constructed so that the first or second rigid polymer layer may have a curvature that does not add optical power to the optical properties of the device. In some embodiments, the first or second rigid polymer layer may have a curvature that adds optical power to the device. In another embodiment, he first or second rigid polymer layer may have a curvature that takes optical power away from the device.

The liquid crystal layer includes materials having a first state with an ordinary refractive index and a second state with an extraordinary refractive index. The transition between the first and second states may be controllable, and the liquid crystal layer may include an element that changes its index of refraction between from the ordinary refractive index to the extraordinary refractive index, or from the extraordinary refractive index to the ordinary refractive index.

By changing its refractive index, the net optical power of the curved surfaces of eye-mountable device is altered, thereby applying controllable accommodation. For example, when the liquid crystal layer is in the first state, and has an ordinary refractive index, the first-layer and second-layer refractive indices may differ from the ordinary refractive index by less than 0.01. Upon switching to the extraordinary refractive index, the first-layer and second-layer refractive indices may differ from the extraordinary refractive index of the liquid crystal layer by greater than 0.01 and the optical properties of the device change. In some embodiments, the switch is from an extraordinary refractive index to a lower ordinary refractive index. In some embodiments, the switch is from an extraordinary refractive index to a higher ordinary refractive index. In other embodiments, the switch is from an ordinary refractive index to a lower extraordinary refractive index. In other embodiments, the switch is from an ordinary refractive index to a higher extraordinary refractive index.

Switching between the ordinary and extraordinary refractive indices can change the focal length of the eye-mounted device. A system with a shorter focal length has greater optical power than one with a long focal length. That is, the greater the optical power, the more sharply the light bends, bringing into focus objects at a shorter distance. Conversely, a longer focal length (lower optical power) brings into focus objects at a greater distance. In some embodiments, the combination of the first and second rigid polymer layers and a liquid crystal with an ordinary refractive index provides a shorter focal length. In other embodiments, the combination of the first and second rigid polymer layers and a liquid crystal with an ordinary refractive index provides a longer focal length. Similarly, in some embodiments, the combination of the first and second rigid polymer layers and a liquid crystal with an extraordinary refractive index provides a shorter focal length. In other embodiments, the combination of the first and second rigid polymer layers and a liquid crystal with an extraordinary refractive index provides a longer focal length.

The liquid crystal layer may include any liquid crystal material known in the art that can undergo a change in refractive index, e.g., upon contact with electric current. The liquid crystal material may be compatible with the assembly process required to construct the eye-mountable device. For example, the liquid crystal may not be soluble in the material of the first and second rigid polymer layers, thus preventing or allowing slow absorption of the liquid crystal layer into the first and second rigid polymer layers.

In some embodiments, the first-layer refractive index and the ordinary refractive index differ by less than 0.01. In some embodiments, the first-layer refractive index and the ordinary refractive index differ by less than 0.005. In some embodiments, the first-layer refractive index and the ordinary refractive index differ by less than 0.001.

In some embodiments, the second-layer refractive index and the ordinary refractive index differ by less than 0.01. In some embodiments, the second-layer refractive index and the ordinary refractive index differ by less than 0.005. In some embodiments, the second-layer refractive index and the ordinary refractive index differ by less than 0.001.

In some embodiments, the first-layer refractive index and the extraordinary refractive index differ by less than 0.01. In some embodiments, the first-layer refractive index and the extraordinary refractive index differ by less than 0.005. In some embodiments, the first-layer refractive index and the extraordinary refractive index differ by less than 0.001.

In some embodiments, the second-layer refractive index and the extraordinary refractive index differ by less than 0.01. In some embodiments, the second-layer refractive index and the extraordinary refractive index differ by less than 0.005. In some embodiments, the second-layer refractive index and the extraordinary refractive index differ by less than 0.001.

In some embodiments, the first-layer refractive index and the second-layer refractive index differ by less than 0.01. In some embodiments, the first-layer refractive index and the second-layer refractive index differ by less than 0.005. In some embodiments, the first-layer refractive index and the second-layer refractive index differ by less than 0.001.

In some embodiments, the first rigid polymer layer, second rigid polymer layer and liquid crystal layer can be selected to provide an eye-mountable device with a first-layer refractive index, second-layer refractive index and ordinary refractive index between 1.40 and 1.55. In some embodiments, the first rigid polymer layer, second rigid polymer layer and liquid crystal layer can be selected to provide an eye-mountable device with a first-layer refractive index, second-layer refractive index and extraordinary refractive index between 1.40 and 1.55. Thus, the first-layer refractive index, second-layer refractive index, ordinary refractive index and extraordinary refractive index may be independently selected as being between any low value (A) and any high value (B) selected from Table 1, provided that the high value (B) is greater than the low value (A). For example, the first-layer refractive index, second-layer refractive index, ordinary refractive index or extraordinary refractive index may be between 1.4420 (A22) and 1.4760 (B39). In some embodiments, a low value (A) is not selected and the first-layer refractive index, second-layer refractive index, ordinary refractive index or extraordinary refractive index is less than or equal to the high value (B). For example, the first-layer refractive index, second-layer refractive index, ordinary refractive index or extraordinary refractive index may be less than 1.4880 (B45). In some embodiments, a high value (B) is not selected and the first-layer refractive index, second-layer refractive index, ordinary refractive index or extraordinary refractive index is greater than or equal to the low value (A). For example, the first-layer refractive index, second-layer refractive index, ordinary refractive index or extraordinary refractive index may be less than 1.4380 (A20). In other embodiments, the first-layer refractive index, second-layer refractive index, ordinary refractive index or extraordinary refractive index is equal to any of the low (A) or high (B) values in Table 1. For example, the first-layer refractive index, second-layer refractive index, ordinary refractive index or extraordinary refractive index may be 1.4380 (A20).

TABLE 1

Range of refractive indices for the first rigid polymer layer, second rigid polymer layer and liquid crystal layer.

|   | A |   | B |   | A |   | B |   | A |   | B |
|---|---|---|---|---|---|---|---|---|---|---|---|
| 1 | 1.4000 | 1 | 1.4000 | 35 | 1.4680 | 35 | 1.4680 | 69 | 1.5360 | 69 | 1.5360 |
| 2 | 1.4020 | 2 | 1.4020 | 36 | 1.4700 | 36 | 1.4700 | 70 | 1.5380 | 70 | 1.5380 |
| 3 | 1.4040 | 3 | 1.4040 | 37 | 1.4720 | 37 | 1.4720 | 71 | 1.5400 | 71 | 1.5400 |
| 4 | 1.4060 | 4 | 1.4060 | 38 | 1.4740 | 38 | 1.4740 | 72 | 1.5420 | 72 | 1.5420 |
| 5 | 1.4080 | 5 | 1.4080 | 39 | 1.4760 | 39 | 1.4760 | 73 | 1.5440 | 73 | 1.5440 |
| 6 | 1.4100 | 6 | 1.4100 | 40 | 1.4780 | 40 | 1.4780 | 74 | 1.5460 | 74 | 1.5460 |
| 7 | 1.4120 | 7 | 1.4120 | 41 | 1.4800 | 41 | 1.4800 | 75 | 1.5480 | 75 | 1.5480 |
| 8 | 1.4140 | 8 | 1.4140 | 42 | 1.4820 | 42 | 1.4820 | 76 | 1.5500 | 76 | 1.5500 |

TABLE 1-continued

Range of refractive indices for the first rigid polymer layer, second rigid polymer layer and liquid crystal layer.

| A | | B | | A | | B | | A | | B | |
|---|---|---|---|---|---|---|---|---|---|---|---|
| 9 | 1.4160 | 9 | 1.4160 | 43 | 1.4840 | 43 | 1.4840 | 52 | 1.5020 | 52 | 1.5020 |
| 10 | 1.4180 | 10 | 1.4180 | 44 | 1.4860 | 44 | 1.4860 | 53 | 1.5040 | 53 | 1.5040 |
| 11 | 1.4200 | 11 | 1.4200 | 45 | 1.4880 | 45 | 1.4880 | 54 | 1.5060 | 54 | 1.5060 |
| 12 | 1.4220 | 12 | 1.4220 | 46 | 1.4900 | 46 | 1.4900 | 55 | 1.5080 | 55 | 1.5080 |
| 13 | 1.4240 | 13 | 1.4240 | 47 | 1.4920 | 47 | 1.4920 | 56 | 1.5100 | 56 | 1.5100 |
| 14 | 1.4260 | 14 | 1.4260 | 48 | 1.4940 | 48 | 1.4940 | 57 | 1.5120 | 57 | 1.5120 |
| 15 | 1.4280 | 15 | 1.4280 | 49 | 1.4960 | 49 | 1.4960 | 58 | 1.5140 | 58 | 1.5140 |
| 16 | 1.4300 | 16 | 1.4300 | 50 | 1.4980 | 50 | 1.4980 | 59 | 1.5160 | 59 | 1.5160 |
| 17 | 1.4320 | 17 | 1.4320 | 51 | 1.5000 | 51 | 1.5000 | 60 | 1.5180 | 60 | 1.5180 |
| 18 | 1.4340 | 18 | 1.4340 | 52 | 1.5020 | 52 | 1.5020 | 61 | 1.5200 | 61 | 1.5200 |
| 19 | 1.4360 | 19 | 1.4360 | 53 | 1.5040 | 53 | 1.5040 | 62 | 1.5220 | 62 | 1.5220 |
| 20 | 1.4380 | 20 | 1.4380 | 54 | 1.5060 | 54 | 1.5060 | 63 | 1.5240 | 63 | 1.5240 |
| 21 | 1.4400 | 21 | 1.4400 | 55 | 1.5080 | 55 | 1.5080 | 64 | 1.5260 | 64 | 1.5260 |
| 22 | 1.4420 | 22 | 1.4420 | 56 | 1.5100 | 56 | 1.5100 | 65 | 1.5280 | 65 | 1.5280 |
| 23 | 1.4440 | 23 | 1.4440 | 57 | 1.5120 | 57 | 1.5120 | 66 | 1.5300 | 66 | 1.5300 |
| 24 | 1.4460 | 24 | 1.4460 | 58 | 1.5140 | 58 | 1.5140 | 67 | 1.5320 | 67 | 1.5320 |
| 25 | 1.4480 | 25 | 1.4480 | 59 | 1.5160 | 59 | 1.5160 | 68 | 1.5340 | 68 | 1.5340 |
| 26 | 1.4500 | 26 | 1.4500 | 60 | 1.5180 | 60 | 1.5180 | 69 | 1.5360 | 69 | 1.5360 |
| 27 | 1.4520 | 27 | 1.4520 | 61 | 1.5200 | 61 | 1.5200 | 70 | 1.5380 | 70 | 1.5380 |
| 28 | 1.4540 | 28 | 1.4540 | 62 | 1.5220 | 62 | 1.5220 | 71 | 1.5400 | 71 | 1.5400 |
| 29 | 1.4560 | 29 | 1.4560 | 63 | 1.5240 | 63 | 1.5240 | 72 | 1.5420 | 72 | 1.5420 |
| 30 | 1.4580 | 30 | 1.4580 | 64 | 1.5260 | 64 | 1.5260 | 73 | 1.5440 | 73 | 1.5440 |
| 31 | 1.4600 | 31 | 1.4600 | 65 | 1.5280 | 65 | 1.5280 | 74 | 1.5460 | 74 | 1.5460 |
| 32 | 1.4620 | 32 | 1.4620 | 66 | 1.5300 | 66 | 1.5300 | 75 | 1.5480 | 75 | 1.5480 |
| 33 | 1.4640 | 33 | 1.4640 | 67 | 1.5320 | 67 | 1.5320 | 76 | 1.5500 | 76 | 1.5500 |
| 34 | 1.4660 | 34 | 1.4660 | 68 | 1.5340 | 68 | 1.5340 | | | | |

In some embodiments, the first rigid polymer layer, second rigid polymer layer and liquid crystal layer can be selected to provide an eye-mountable device with a first-layer refractive index, second-layer refractive index and ordinary refractive index between 1.55 and 1.80. In some embodiments, the first rigid polymer layer, second rigid polymer layer and liquid crystal layer can be selected to provide an eye-mountable device with a first-layer refractive index, second-layer refractive index and extraordinary refractive index between 1.55 and 1.80. The first-layer refractive index, second-layer refractive index, ordinary refractive index and extraordinary refractive index may be independently selected as being between any low value (A) and any high value (B) selected from Table 2, provided that the high value (B) is greater than the low value (A). For example, the first-layer refractive index, second-layer refractive index, ordinary refractive index or extraordinary refractive index may be between 1.6550 (A22) and 1.7400 (B39). In some embodiments, a low value (A) is not selected and the first-layer refractive index, second-layer refractive index, ordinary refractive index or extraordinary refractive index is less than or equal to the high value (B). For example, the first-layer refractive index, second-layer refractive index, ordinary refractive index or extraordinary refractive index may be less than 1.7700 (B45). In some embodiments, a high value (B) is not selected and the first-layer refractive index, second-layer refractive index, ordinary refractive index or extraordinary refractive index is greater than or equal to the low value (A). For example, the first-layer refractive index, second-layer refractive index, ordinary refractive index or extraordinary refractive index may be less than 1.6450 (A20). In other embodiments, the first-layer refractive index, second-layer refractive index, ordinary refractive index or extraordinary refractive index is equal to any of the low (A) or high (B) values in Table 2. For example, the first-layer refractive index, second-layer refractive index, ordinary refractive index or extraordinary refractive index may be 1.6450 (A20).

TABLE 2

Range of refractive indices for the first rigid polymer layer, second rigid polymer layer and liquid crystal layer.

| A | | B | |
|---|---|---|---|
| 1 | 1.5500 | 1 | 1.5500 |
| 2 | 1.5550 | 2 | 1.5550 |
| 3 | 1.5600 | 3 | 1.5600 |
| 4 | 1.5650 | 4 | 1.5650 |
| 5 | 1.5700 | 5 | 1.5700 |
| 6 | 1.5750 | 6 | 1.5750 |
| 7 | 1.5800 | 7 | 1.5800 |
| 8 | 1.5850 | 8 | 1.5850 |
| 9 | 1.5900 | 9 | 1.5900 |
| 10 | 1.5950 | 10 | 1.5950 |
| 11 | 1.6000 | 11 | 1.6000 |
| 12 | 1.6050 | 12 | 1.6050 |
| 13 | 1.6100 | 13 | 1.6100 |
| 14 | 1.6150 | 14 | 1.6150 |
| 15 | 1.6200 | 15 | 1.6200 |
| 16 | 1.6250 | 16 | 1.6250 |
| 17 | 1.6300 | 17 | 1.6300 |
| 18 | 1.6350 | 18 | 1.6350 |
| 19 | 1.6400 | 19 | 1.6400 |
| 20 | 1.6450 | 20 | 1.6450 |
| 21 | 1.6500 | 21 | 1.6500 |
| 22 | 1.6550 | 22 | 1.6550 |
| 23 | 1.6600 | 23 | 1.6600 |
| 24 | 1.6650 | 24 | 1.6650 |
| 25 | 1.6700 | 25 | 1.6700 |
| 26 | 1.6750 | 26 | 1.6750 |
| 27 | 1.6800 | 27 | 1.6800 |
| 28 | 1.6850 | 28 | 1.6850 |
| 29 | 1.6900 | 29 | 1.6900 |
| 30 | 1.6950 | 30 | 1.6950 |
| 31 | 1.7000 | 31 | 1.7000 |
| 32 | 1.7050 | 32 | 1.7050 |
| 33 | 1.7100 | 33 | 1.7100 |
| 34 | 1.7150 | 34 | 1.7150 |
| 35 | 1.7200 | 35 | 1.7200 |
| 36 | 1.7250 | 36 | 1.7250 |
| 37 | 1.7300 | 37 | 1.7300 |
| 38 | 1.7350 | 38 | 1.7350 |

TABLE 2-continued

Range of refractive indices for the first rigid polymer layer, second rigid polymer layer and liquid crystal layer.

| A | | B | |
|---|---|---|---|
| 39 | 1.7400 | 39 | 1.7400 |
| 40 | 1.7450 | 40 | 1.7450 |
| 41 | 1.7500 | 41 | 1.7500 |
| 42 | 1.7550 | 42 | 1.7550 |
| 43 | 1.7600 | 43 | 1.7600 |
| 44 | 1.7650 | 44 | 1.7650 |
| 45 | 1.7700 | 45 | 1.7700 |
| 46 | 1.7750 | 46 | 1.7750 |
| 47 | 1.7800 | 47 | 1.7800 |
| 48 | 1.7850 | 48 | 1.7850 |
| 49 | 1.7900 | 49 | 1.7900 |
| 50 | 1.7950 | 50 | 1.7950 |
| 51 | 1.8000 | 51 | 1.8000 |

The extraordinary refractive index can be higher than the ordinary refractive index. For example, the liquid crystal can have an ordinary refractive index between 1.40 and 1.55 and an extraordinary refractive index between 1.60 and 1.80. The ordinary refractive index of the liquid crystal layer may be selected according to the values in Table 2. The extraordinary refractive index of the liquid crystal layer may be between 1.60 and 1.65, or 1.60 and 1.70, or 1.60 and 1.75, or 1.65 and 1.70, or 1.70 and 1.75, or 1.65 and 1.80, or 1.70 and 1.75, or 1.70 and 1.80, or 1.75 and 1.80. In some embodiments, the extraordinary refractive index of the liquid crystal layer is greater than 1.60, or greater than 1.65, or greater than 1.70, or greater than 1.75, or greater than 1.80.

In other embodiments, the ordinary refractive index can be higher than the extraordinary refractive index. For example, the liquid crystal can have an extraordinary refractive index between 1.40 and 1.55 and an ordinary refractive index between 1.60 and 1.80. The extraordinary refractive index of the liquid crystal layer may be selected according to the values in Table 2. The ordinary refractive index of the liquid crystal layer may be between 1.60 and 1.65, or 1.60 and 1.70, or 1.60 and 1.75, or 1.65 and 1.70, or 1.70 and 1.75, or 1.65 and 1.80, or 1.70 and 1.75, or 1.70 and 1.80, or 1.75 and 1.80. In some embodiments, the ordinary refractive index of the liquid crystal layer is greater than 1.60, or greater than 1.65, or greater than 1.70, or greater than 1.75, or greater than 1.80.

The eye-mountable devices will now be described further in relation to the FIGURES.

FIG. 1A is a diagram illustrating an eye-mountable device 100 according to embodiments disclosed herein. The eye-mountable device 100 includes a first rigid polymer layer 110, a second rigid polymer layer 120, and a liquid crystal layer 130 positioned between the first rigid polymer layer 110 and the second rigid polymer layer 120 (i.e., a "first rigid polymer layer-liquid crystal layer-second rigid polymer layer" arrangement, or "three-layer device"). Accordingly, in certain embodiments, the liquid crystal layer is between the first and second rigid polymer layers.

Figure 1B:
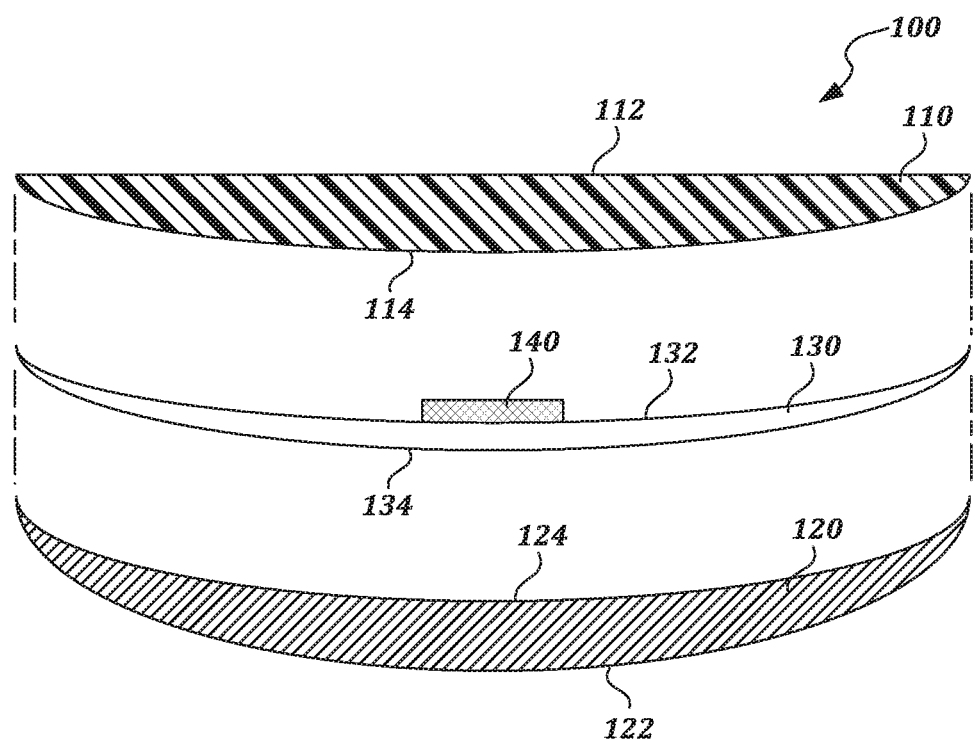
FIG. 1B is a diagram illustrating an eye-mountable device in accordance with embodiments disclosed herein.

FIG. 1B is a diagram illustrating a partially exploded view of a representative eye-mountable device 100, where the first rigid polymer layer 110, second rigid polymer layer 120, and liquid crystal layer 130 are separated so that the details of each layer can be illustrated. The first rigid polymer layer 110 has an outside surface 112 and an inside surface 114, the second rigid polymer layer 120 has an outside surface 122 and an inside surface 124, and liquid crystal layer 130 has first surface 132 and a second surface 134. In some embodiments, the inside surface 114 of the first rigid polymer layer 110 is in contact with the first side 132 of the liquid crystal layer 130, and the inside surface 124 of the second rigid polymer layer 120 is in contact with the second surface 134 of the liquid crystal layer 130. In some embodiments, the first rigid polymer layer 110, second rigid polymer layer 120, and liquid crystal layer 130 are substantially circular in plan view and first rigid polymer layer 110, second rigid polymer layer 120, and liquid crystal layer 130 have substantially similar radii. In certain embodiments, the inside surface 114 of the first rigid polymer layer 110 and the inside surface 124 of the second rigid polymer 120 are not in contact. In other embodiments, the first rigid polymer layer 110, second rigid polymer layer 120, and liquid crystal layer 130 are substantially circular and the radii of the first rigid polymer layer 110 and second rigid polymer layer 120 are larger than the radius of the liquid crystal layer 130. In these embodiments, the inside surface 114 of the first rigid polymer layer 110 and the inside surface 124 of the second rigid polymer 120 are in contact. In some embodiments, an electric circuit 140 is in contact with first surface 132 or the second surface 134 of the liquid crystal layer 130.

The liquid crystal layer may have the same surface area as the first and second rigid polymer layers, or a smaller surface area as the first and second rigid polymer layers. The liquid crystal layer may be in contact with 5 percent to 100 percent of the surface of the first rigid polymer layer or second rigid polymer layers. For example, the liquid crystal layer may be in contact with 10 percent to 100 percent, or 15 percent to 100 percent, or 20 percent to 100 percent, or 25 percent to 100 percent, or 30 percent to 100 percent, or 35 percent to 100 percent, or 40 percent to 100 percent, or 45 percent to 100 percent, or 50 percent to 100 percent, or 55 percent to 100 percent, or 60 percent to 100 percent, or 65 percent to 100 percent, or 70 percent to 100 percent, or 75 percent to 100 percent, or 80 percent to 100 percent, or 85 percent to 100 percent, or 90 percent to 100 percent, or 95 percent to 100 percent of the surface of the first rigid polymer layer or second rigid polymer layers.

In some embodiments, the liquid crystal layer is in contact with greater than 50 percent of the first rigid polymer layer or second rigid polymer layers. For example, the liquid crystal layer is in contact with greater than 50 percent, or greater than 55 percent, or greater than 60 percent, or greater than 65 percent, or greater than 70 percent, or greater than 75 percent, or greater than 80 percent, or greater than 85 percent, or greater than 90 percent, or greater than 95 percent of the first rigid polymer layer or second rigid polymer layers.

Figure 1C:
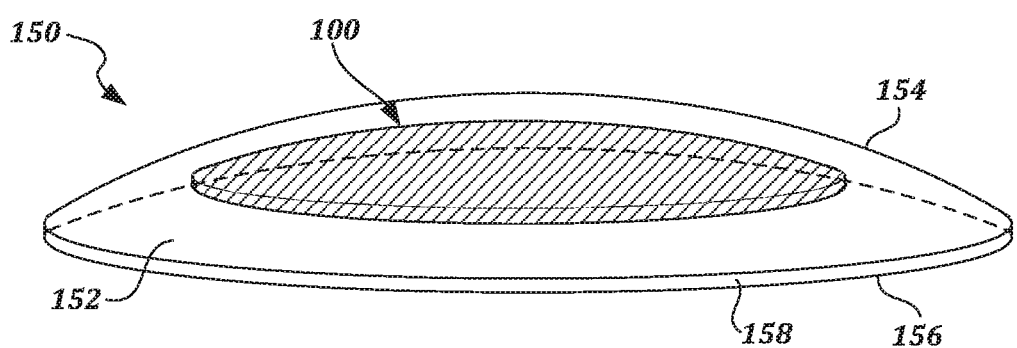
FIG. 1C is a perspective view of an eye-mountable device in accordance with embodiments disclosed herein.
Figure 1D:
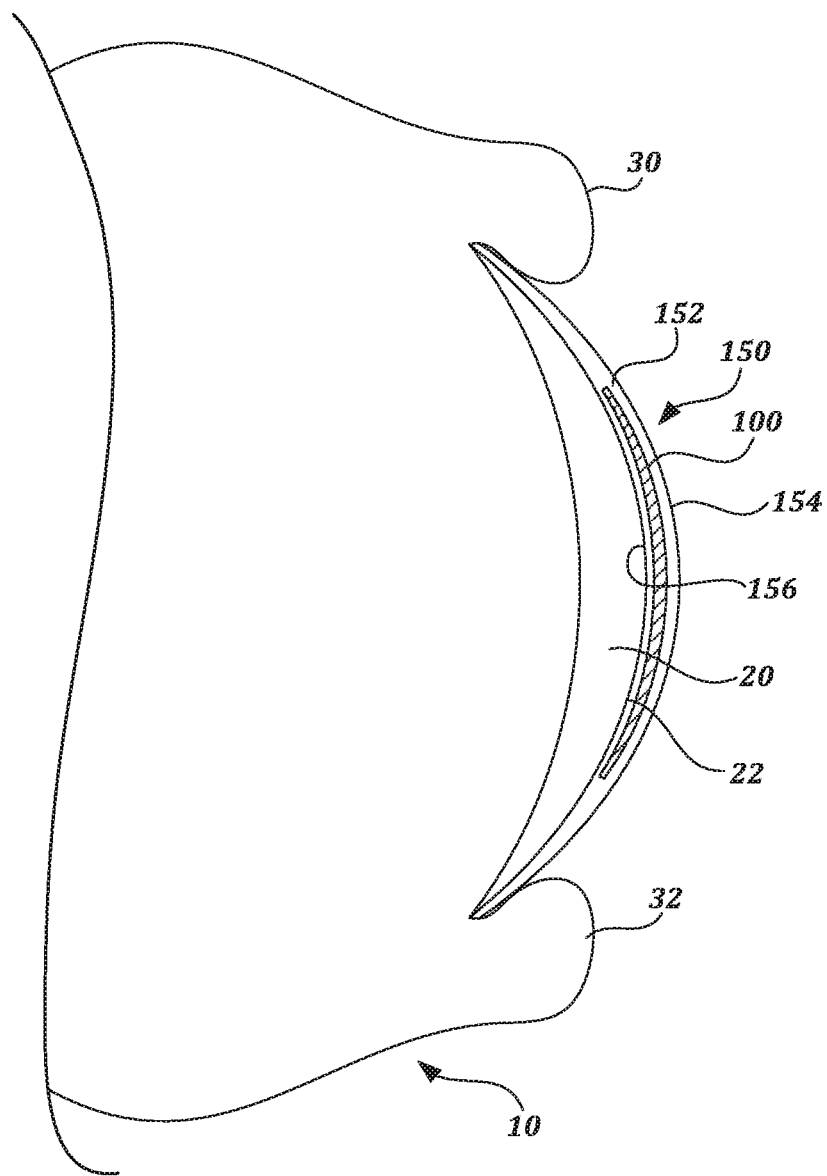
FIG. 1D is a cross-sectional view of an eye-mountable device in accordance with embodiments disclosed herein mounted onto an eye.
Figure 1E:
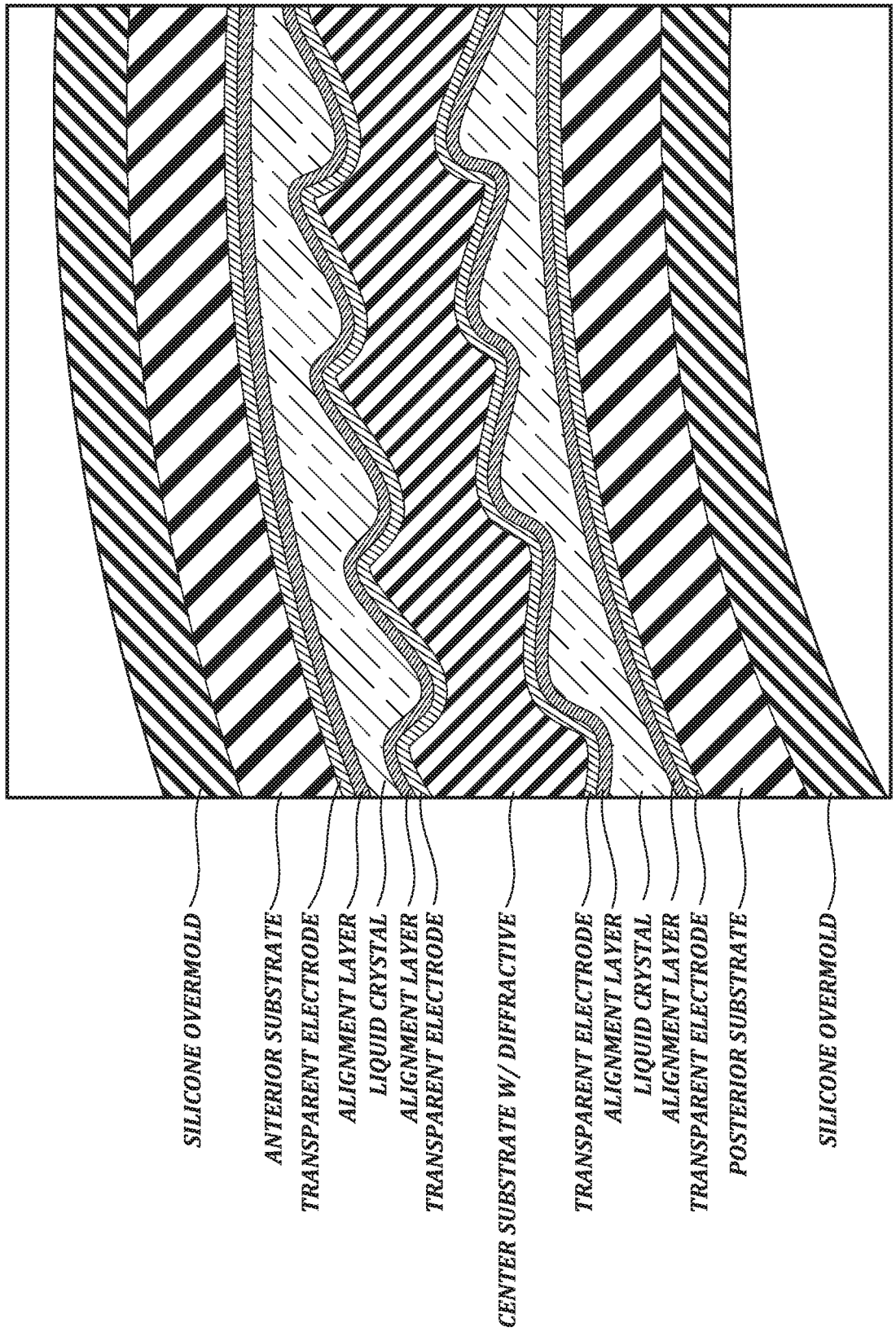
FIG. 1E is a cross-sectional view of layers forming a "five-layer" (three rigid polymer layers separated by two liquid crystal layers) eye-mountable device in accordance with embodiments disclosed herein.

A generalized n-layer eye-mountable device 150 is illustrated in FIG. 1C with a soft overmold, and the overmolded eye-mountable device 150 is illustrated covering an eye in cross-sectional view in FIG. 1D. Referring first to FIG. 1C, the overmolded eye-mountable device 150 includes an eye-mountable device 100 as described above, embedded within a soft polymer layer 152 ("overmold"). In one embodiment the soft polymer layer 152 fully encloses the eye-mountable device 100.

In one embodiment, the soft polymer layer 152 is shaped as a curved disk. The soft polymer layer 152 and eye-mountable device 100 are composed of substantially transparent materials to allow incident light to be transmitted to the eye while the overmolded eye-mountable device 150 is mounted to the eye. In one embodiment, the soft polymer layer 152 is a biocompatible, oxygen-permeable material similar to those employed to form soft vision correction and/or cosmetic contact lenses in optometry, such as a silicone hydrogel.

In one embodiment the soft polymer layer 152 and/or the eye-mountable device 100 include biocompatible, oxygen-permeable materials having the oxygen permeability disclosed elsewhere herein.

In one embodiment the soft polymer layer 152 and/or the eye-mountable device 100 include further compounds or materials to provide additional functionality. An exemplary additional functionality is to block ultraviolet light from being transmitted through the eye-mountable device 150 to an eye.

In another embodiment, the soft polymer layer 152 includes a surface coating configured to provide a functionality. An exemplary functionality includes a hydrophilic coating to increase wetting and/or comfort.

The soft polymer layer 152 can be formed with one side having a concave surface 156 suitable to fit over a corneal surface of an eye. The opposing side of the disk can have a convex surface 154 that does not interfere with eyelid motion when the eye-mountable device 150 is mounted to the eye. A circular outer side edge 158 connects the concave surface 154 and convex surface 156. The eye-mountable device 150 can have dimensions similar to a vision correction and/or cosmetic contact lenses, such as a diameter of approximately 1 centimeter, and a thickness of 0.1 to 0.5 millimeters. However, the diameter and thickness values are provided for explanatory purposes only. In some embodiments, the dimensions of the eye-mountable device 150 can be selected according to the size and/or shape of the corneal surface of the wearer's eye. The shape of the eye-mountable device 150 can be specified with a curvature, astigmatism, or other properties to provide a specified optical power to an eye. Additionally or alternatively, the shape of the eye-mountable device 150 could be specified to apply a force to a cornea of an eye to which the eye-mountable device 150 is mounted, e.g., to correct keratoconus or according to some other application.

The soft polymer layer 152 can be formed with a curved shape in a variety of ways. For example, techniques similar to those employed to form vision-correction contact lenses can be employed to form the soft polymer layer 152. These methods can include molding, as disclosed in greater detail herein, machining, lathing, polishing, or other processes. While the eye-mountable device 150 is mounted in an eye, the convex surface 154 faces outward to the ambient environment while the concave surface 156 faces inward, toward the corneal surface. The convex surface 154 can therefore be considered an outer, top surface of the eye-mountable device 150 whereas the concave surface 156 can be considered an inner, bottom surface.

Referring specifically to FIG. 1D, a cross-sectional view of the overmolded eye-mountable device 150 is illustrated covering an eye 10. The eye 10 includes a cornea 20 that is covered by bringing the upper eyelid 30 and lower eyelid 32 together over the top of the eye 10. Incident light is received by the eye 10 through the overmolded eye-mountable device 150. The motion of the eyelids distributes a tear film across the exposed corneal surface 22 of the eye 10. The tear film is an aqueous fluid secreted by the lacrimal gland to protect and lubricate the eye 10. The tear film layers are distributed across the corneal surface 22 and/or the convex surface 154 by motion of the eyelids 30, 32. For example, the eyelids 30, 32 raise and lower, respectively, to spread a small volume of tear film across the corneal surface 22 and/or the convex surface 154 of the eye-mountable device 110. The tear film layer on the corneal surface 22 also facilitates mounting the eye-mountable device 150 by capillary forces between the concave surface 156 and the corneal surface 22. In some embodiments, the eye-mountable device 110 can also be held over the eye in part by vacuum forces against corneal surface 22 due to the concave curvature of the eye-facing concave surface 156.

It should be appreciated that while FIG. 1D illustrates the overmolded eye-mountable device 150 mounted on an eye 10, eye-mountable devices 100 as disclosed herein without an overmold soft polymer layer 152 can be formed so as to directly contact an eye.

In other embodiments, the device includes a second liquid crystal layer and a third rigid polymer layer (i.e., a five-layer device). An exemplary five-layer device is illustrated in FIG. 1E. In one embodiment, the eye-mountable device further includes a third rigid polymer layer having a third-layer refractive index and a second liquid crystal layer between the second rigid polymer layer and the third rigid polymer layer, wherein
- the second liquid crystal layer has a an ordinary refractive index and an extraordinary refractive index,
- the second-layer refractive index and the third-layer refractive index differ by less than 0.01,
- the second liquid crystal layer the ordinary refractive index and the extraordinary refractive index differ by more than 0.1, and
- the first-layer refractive index differs from either the ordinary refractive index or the extraordinary refractive index by less than 0.01.

In the five-layer device, the second liquid crystal layer is as defined for the liquid crystal layer described herein, and the third rigid polymer layer is as defined for the first rigid polymer layer described herein. The arrangement for the five-layer device is similar to the three-layer device, except the single liquid crystal layer is replaced with two liquid crystal layers separated by the third rigid polymer layer (i.e., a "first rigid polymer layer-first liquid crystal layer-third rigid polymer layer-second liquid crystal layer-second rigid polymer layer" arrangement).

Referring specifically to FIG. 1E, the five-layer device includes an encapsulating soft overmold (labeled as a "silicone overmold") as described elsewhere herein. The five-layer device includes three rigid polymer layers ("anterior substrate"; "center substrate"; and "posterior substrate") according to the embodiments disclosed herein. The center substrate in FIG. 1E is illustrated as having a textured diffractive element so as to provide additional optical power. Two liquid crystal layers are between the rigid polymer layers, with each liquid crystal layer surrounded by a top and bottom alignment layer to provide isotropic ordering of the liquid crystal layers. Finally, transparent electrodes between the rigid polymer layers and the alignment layers provide control over the orientation of the liquid crystal layers in order to provide controllable optical focusing for the eye-mountable device.

Figure 2:
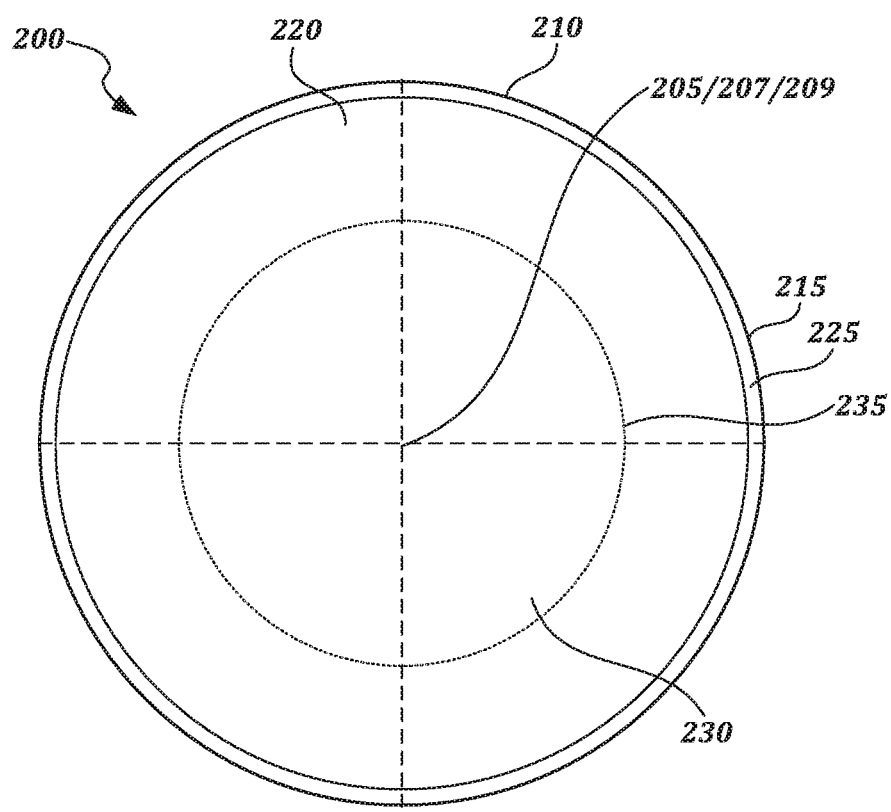
FIG. 2 is a diagram illustrating an eye-mountable device in accordance with embodiments disclosed herein.

In some embodiments, the liquid crystal layer may be centered on the first rigid polymer layer and second rigid polymer layers so that their center points are aligned. FIG. 2 is a diagram illustrating an eye-mountable device 200 according to an example embodiment. When the first rigid polymer layer 210, second rigid polymer layer 220 and liquid crystal layer 230 are substantially circular, each with a center point 205/207/209 and an edge 215/225/235, they are aligned so that their center points 205/207/209 are substantially aligned.

Figure 3:
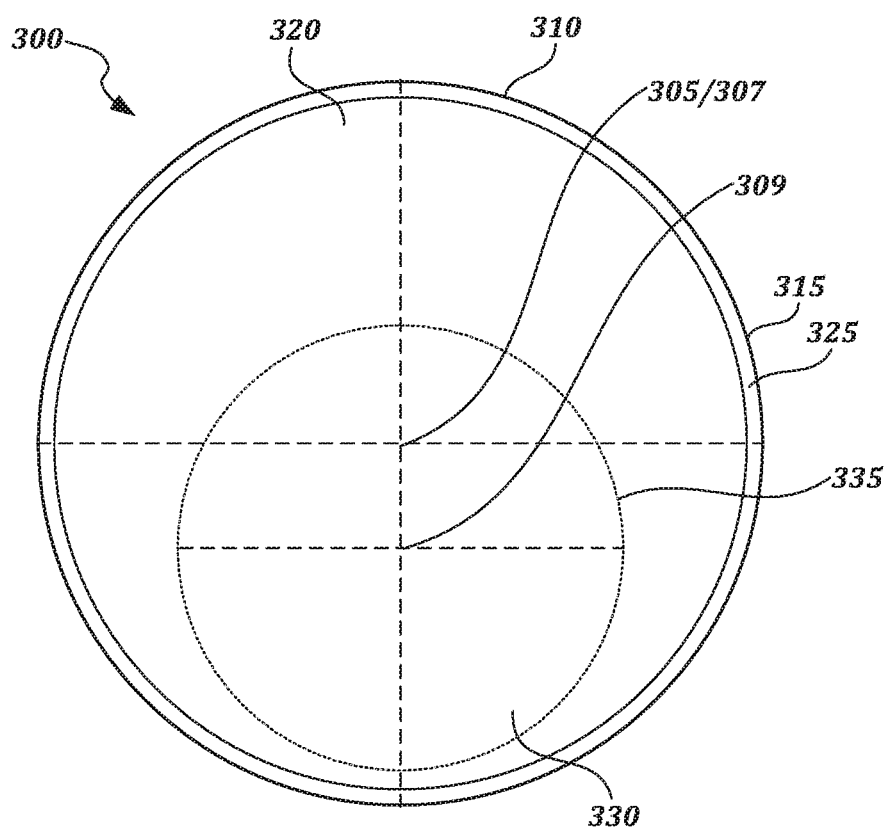
FIG. 3 is a diagram illustrating an eye-mountable device in accordance with embodiments disclosed herein.

In other embodiments, center points of the first rigid polymer layer and second rigid polymer layer are aligned but the center point of the liquid crystal layer is not. FIG. 3 is a diagram illustrating an eye-mountable device 300 according to an example embodiment. When the first rigid polymer layer 310, second rigid polymer layer 320 and liquid crystal layer 330 are substantially circular, each with a center point 305/307/309 and an edge 315/325/235, they may be aligned so that the center of the liquid crystal layer 309 is between the center point 305/307 and the edge of the first rigid polymer 315 or second rigid polymer 325. In some embodiments, the entire liquid crystal layer is aligned between the center point 305 and the edge of the first rigid polymer 315 or second rigid polymer 325.

In another aspect, the present disclosure provides a method for fabricating an eye-mountable device. The method involves forming a first monomer solution; curing the first monomer solution to provide the first rigid polymer layer; forming a second monomer solution; curing the second monomer solution to provide the second rigid polymer layer; and providing the liquid crystal layer between the first rigid polymer layer and second rigid polymer. In some embodiments, the first monomer solution and the second monomer solution are the same. In some embodiments, the method further includes providing an electric circuit between the first rigid polymer layer and the second rigid polymer layer. In other embodiments, additional layers may be included between the rigid polymer layers and the liquid crystal layers, including transparent conductive layers and liquid-crystal-alignment layers, as illustrated in FIG. 1E.

The method may involve selecting the appropriate first monomer, second monomer and liquid crystal layer to provide an eye-mountable device according to any embodiment above. For example, the first or second monomer may include 5 weight percent to 10 weight percent Bisphenol A dimethacrylate, 20 weight percent to 30 weight percent 1,1,1,3,3,3-Hexafluoroisopropyl methacrylate, 7 weight percent to 12 weight percent methyl methacrylate, 10 weight percent to 20 weight percent 3-[Tris(trimethylsiloxy)silyl] propyl methacrylate, 27 weight percent to 33 weight percent o-phenylphenol ethyl acrylate and 10 weight percent to 20 weight percent methacryloxypropyl terminated polydimethylsiloxane, 8-14 cSt.

In certain embodiments, one or more of the rigid polymer layers is cast-molded, as described above. Accordingly, in one embodiment, the step of curing the first monomer solution to provide the first rigid polymer layer comprises curing the first monomer in a cast mold. In one embodiment, the step of curing the second monomer solution to provide the second rigid polymer layer comprises curing the second monomer in a cast mold.

The monomeric mixture for forming the rigid polymer layers can be polymerized by methods known in the art, including the application of heat or ultraviolet radiation, and if desired, the mixture can be treated with gamma radiation to reduce any unreacted monomers.

Figure 4:
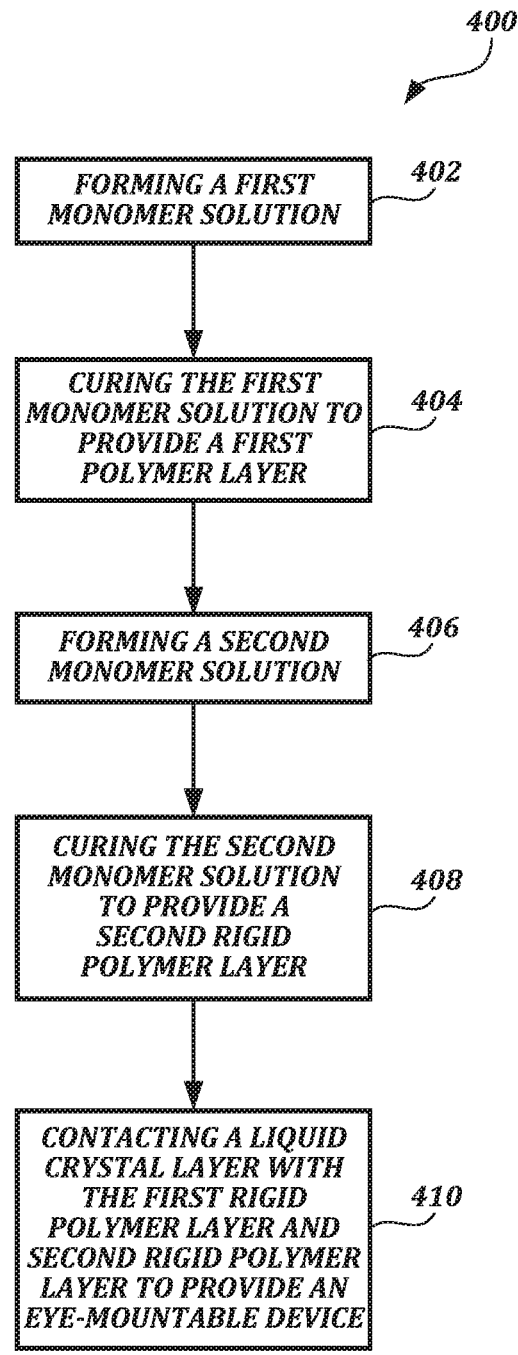
FIG. 4 is a flow chart illustrating a method in accordance with embodiments disclosed herein.

FIG. 4 is a flow chart illustrating a method 400 according to an example embodiment. More specifically, as shown by block 402, the method 400 may involve forming a first monomer solution. Further, as shown by block 404, the method 400 may involve curing the first monomer solution to provide the first rigid polymer layer. Further still, as shown by block 406, the method 400 may involve forming a second monomer solution, and as shown by block 408, curing the second monomer solution to provide the second rigid polymer layer. Further still, as shown by block 410, the method 400 may involve contacting a liquid crystal layer with the first rigid polymer layer and second rigid polymer layer to provide an eye-mountable device In some embodiments, the first or second monomer solution may be cured in a molding piece, which may include a metal (e.g., aluminum or an aluminum alloy) or a polymer (e.g., polycarbonate, nylon polysulfone, polymethyl methacrylate, polyethylene terephthalate, polycarbonate, polystyrene, polybutadiene, or polyethylene). In such embodiments, the mold surface may be shaped to provide the desired contour of the resulting rigid polymer layer. In some embodiments, the mold surface may be treated so the resulting rigid polymer layer may be removed from the mold without damage. The treatment may include modifying a first side of the molding piece differently than a second side, enabling the selective removal of the first side over the second side.

In another aspect, the invention provides a method for changing the focal length of the eye-mountable device. The method involves switching the liquid crystal layer from the ordinary refractive index to the extraordinary refractive index, wherein the first-layer refractive index differs from either the ordinary refractive index or the extraordinary refractive index by less than 0.01. In another embodiment, the method involves switching the liquid crystal layer from the extraordinary refractive index to the ordinary refractive index, wherein the first-layer refractive index differs from either the ordinary refractive index or the extraordinary refractive index by less than 0.01

In some embodiments, the method further includes a step for sending a signal to the eye-mountable device to initiate the switching from the ordinary refractive index to the extraordinary refractive index, or from the extraordinary refractive index to the ordinary refractive index. The step may include detecting a stimuli or environmental parameter before sending the signal to the eye-mountable device. The eye-mountable device may include electronics capable of providing an electrical current to the liquid crystal layer, such as electrodes and an electrical circuit. In some embodiments, the switching is manually controlled by the user of the eye-mountable device, whereas in other embodiments where the switching occurs in response to a signal resulting from the detection of certain environmental parameters, the device may further include a signal detector (e.g., an antenna).

Further, some embodiments may include privacy controls which may be automatically implemented or controlled by the wearer of a body-mountable device. For example, where a wearer's collected physiological parameter data and health state data are uploaded to a cloud computing network for trend analysis by a clinician, the data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Additionally or alternatively, wearers of a body-mountable device may be provided with an opportunity to control whether or how the device collects information about the wearer (e.g., information about a user's medical history, social actions or activities, profession, a user's preferences, or a user's current location), or to control how such information may be used. Thus, the wearer may have control over how information is collected about him or her and used by a clinician or physician or other user of the data. For example, a wearer may elect that data, such as health state and physiological parameters, collected from his or her device may only be used for generating an individual baseline and recommendations in response to collection and comparison of his or her own data and may not be used in generating a population baseline or for use in population correlation studies.

Experimental

Refractive index measurements were made on an Atago digital refractometer and are reported for wavelength number 589 nm as measured from a 1"×1"×10 mm flat prepared in a PTFE sample dish under the same conditions as lens cure. The values are measured in reference to monobromonapthalene. Hardness measurements made using an ASTM Type D Ergo Durometer. Shrinkage measurements were based on several dimensional measurements at the macroscopic and microscopic level. Macroscopic measurements included: center thickness, sag, and lens diameter. Microscopic measurements included: fine surface features with "vertical" dimensions less than 10 microns, and "horizontal" dimensions less than 100 microns. Identical data was collected from lenses and from molds and compared to provide a robust understanding of shrinkage that occurs during the polymerization.

Representative procedure for I4 involves preparation of a first monomer mixture in a nitrogen purged glovebox with maintained inert environment. First, 100 mg of bisphenol-A-dimethacrylate (BPA-DMA) is measured into a 4 mL amber vial and brought into the nitrogen filled glovebox. Next, the BPA-DMA is mostly dissolved in methyl methacrylate (200 μL) and of o-phenylphenol ethyl acrylate (600 μL) prior to addition of 3-[Tris(trimethylsiloxy)silyl]propyl methacrylate (350 μL), Hexafluoroisopropyl methacrylate (500 μL), methacryloxypropyl terminated polydimethylsiloxane 8-14 cSt (280 μL) and 2-hydroxy-2-methylpropiophenone/Irgacure 1173 (20 μL). After dissolution of all solids the mixture is stored at −4° C. shielded from light until use. To form a cast molded RGP, an aliquot of I4 monomer in excess of the void volume of the chosen mold is dispensed into a bottom mold, capped with a top mold, and UV cured for 1 hour under event force. After molding all materials are removed from the glovebox, the molds are separated and the lens removed.

RGP-K3 was formed similarly to I4, except BPA-DMA (150 mg) is dissolved in methyl methacrylate (200 μL) and of o-phenylphenol ethyl acrylate (600 μL) prior to addition of 3-[Tris(trimethylsiloxy)silyl]propyl methacrylate (350 μL), Hexafluoroisopropyl methacrylate (500 μL), methacryloxypropyl terminated polydimethylsiloxane 8-14 cSt (280 μL) and 2-hydroxy-2-methylpropiophenone/Irgacure 1173 (20 μL).

RGP-K4 was formed similarly to I4, except BPA-DMA (100 mg) is dissolved in methyl methacrylate (200 μL) and of o-phenylphenol ethyl acrylate (600 μL) prior to addition of 3-[Tris(trimethylsiloxy)silyl]propyl methacrylate (330 μL), Hexafluoroisopropyl methacrylate (550 μL), methacryloxypropyl terminated polydimethylsiloxane 8-14 cSt (230 μL) and 2-hydroxy-2-methylpropiophenone/Irgacure 1173 (20 μL).

Oxygen Permeability was assessed on representative lenses with center thickness between 250-300 microns by Intertek Allentown on a Dow Cell permeation unit. The values reported below in Table 3 are non-calibrated, but represent oxygen permeability values that are greater than a 100 Barrer test lens.

TABLE 3

Oxygen permeability testing of representative materials.

| Sample IDS | Barrers |
|---|---|
| RGP - I4 | 478 |
| RGP - K3 | 369 |
| RGP - K4 | 291 |

Mechanical properties were also assessed, as reported in Table 4. Modulus, yield stress and stress at break were measured using Instron 5967 with load capacity up to 30 kN.

TABLE 4

Mechanical property testing of representative materials.

| Formulation | Modulus [MPa] | Yield Stress [MPa] | Stress at Break [MPa] |
|---|---|---|---|
| RGP - I4 | 903 ± 26 | 18.2 ± 0.7 | 14.4 ± 1.8 |
| RGP - K3 | 1099 ± 54 | 21.6 ± 0.7 | 17 ± 1.7 |
| RGP - K4 | 978 ± 65 | 20.9 ± 1.1 | 13.6 ± 0.6 |

RGP-K13 through RGP-K17 was formed similarly to I4 and the amounts of each component are shown in Table 5. As an example for K13 BPA-DMA (150 mg) is dissolved in methyl methacrylate (200 μL) and of phenyl methacrylate (600 μL) prior to addition of 3-[Tris(trimethylsiloxy)silyl]propyl methacrylate (490 μL), Hexafluoroisopropyl methacrylate (500 μL), methacryloxypropyl terminated polydimethylsiloxane 8-14 cSt (140 μL) and 2-hydroxy-2-methylpropiophenone/Irgacure 1173 (20 μL).

TABLE 5

Formulation of representative materials.

| Formulation | mgs BPA-DM | microliters DMS-R11 | microliters HF-MA | microliters TRIS-MA | microliters MMA | microliters X-monomer | X-monomer | microliters DC-1173 |
|---|---|---|---|---|---|---|---|---|
| K13 | 150 | 140 | 500 | 490 | 200 | 600 | Phenyl-MA | 20 |
| K14 | 150 | 140 | 500 | 490 | 200 | 150/450 | DP-MA/Ph-MA | 20 |
| K15 | 150 | 140 | 500 | 490 | 200 | 300/300 | DP-MA/Ph-MA | 20 |
| K16 | 150 | 140 | 500 | 490 | 200 | 450/150 | DP-MA/Ph-MA | 20 |
| K17 | 150 | 140 | 500 | 490 | 200 | 600 | DP-MA | 20 |

In the table above BPA-DM is bisphenol-A-dimethacrylate; DMS-R11 is methacryloxypropyl terminated polydimethylsiloxane 8-14 cSt; HF-MA is hexafluoroisopropyl methacrylate; TRIS -MA is 3-[tris(trimethylsiloxy)silyl]propyl methacrylate; MMA is methyl methacrylate, Phenyl-MA is phenyl methacrylate; DP-MA is diphenyl methacrylate, and DC-1173 is 2-hydroxy-2-methylpropiophenone.

In the formulations above (K13 to K17) the amount of phenyl methacrylate to diphenyl methacrylate could be utilized to tune the refractive index properties of the formulation. In this particular example, the refractive index of the lens could be tuned from 1.4770 when 600 microliters of phenyl methacrylate was used in the formulation to 1.4934 when 600 microliters of diphenyl methacrylate was used in the formulation, as illustrated in Table 6.

TABLE 6

Refractive index and composition of representative materials.

| Formulation | RI mix | RI Lens* | Vol % DP-MA |
|---|---|---|---|
| K13 | 1.436 | 1.4770 | 0 |
| K14 | 1.444 | 1.4852 | 25 |
| K15 | 1.449 | 1.4903 | 50 |
| K16 | 1.4509 | 1.4922 | 75 |
| K17 | 1.4521 | 1.4934 | 100 |

It should be understood that the RI of the lens can be tuned with a number of high RI monomers and that the use of diphenyl methacrylate is not intended to be limiting.

Figure 5:
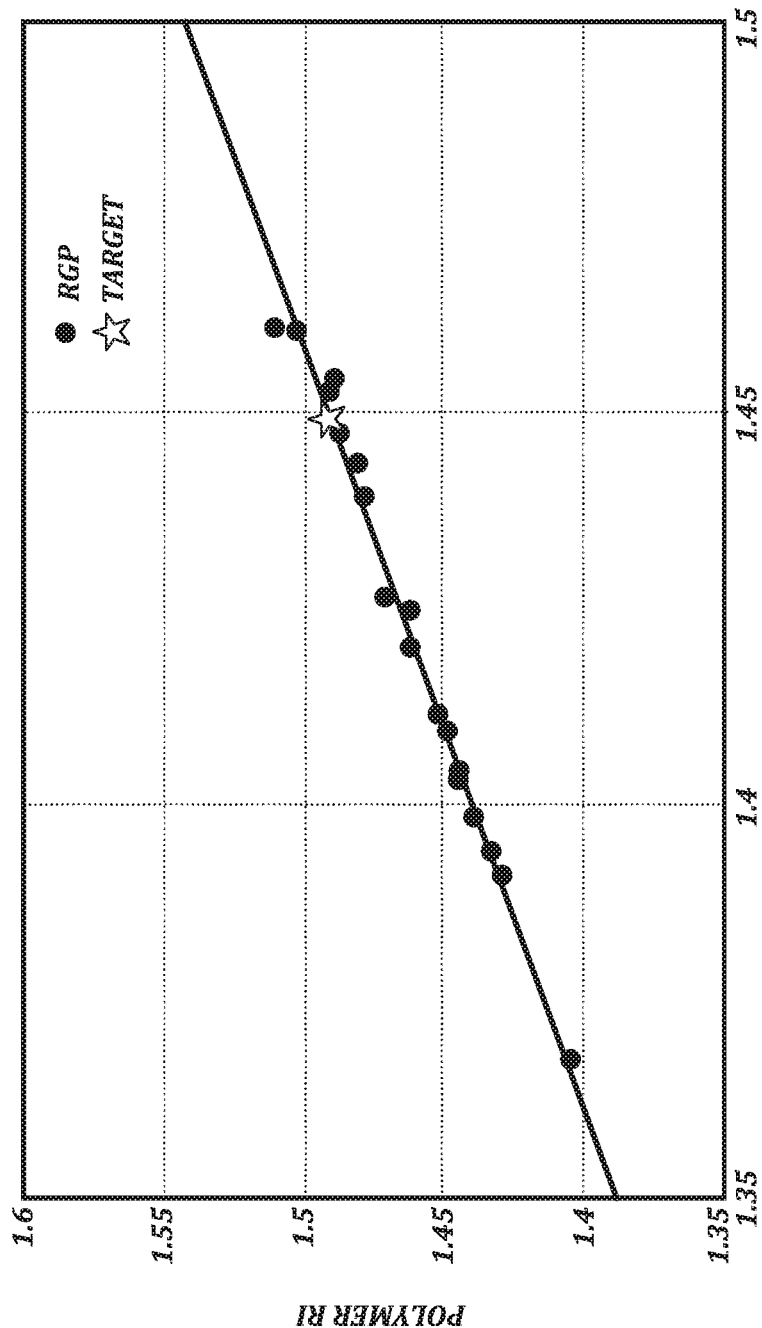
FIG. 5 is a graph illustrating the refractive index of exemplary monomer mixtures compared to the refractive index of polymers formed from the monomer mixtures.

FIG. 5 is a graph illustrating the refractive index of exemplary monomer mixtures compared to the refractive index of polymers formed from the monomer mixtures. These data were produced using polymers disclosed herein and illustrate the broad capabilities of formulating rigid polymer layers having a refractive index between 1.45 and 1.5. The target RI on FIG. 5 is 1.488, which is the ordinary refractive index of a presently preferred liquid crystal formulation. The range disclosed in FIG. 5 is common for the ordinary refractive index of many liquid crystal mixtures. As noted above, in certain embodiments the refractive index of the rigid polymer layers are closely matched to the refractive index of the liquid crystal.

Figure 6:
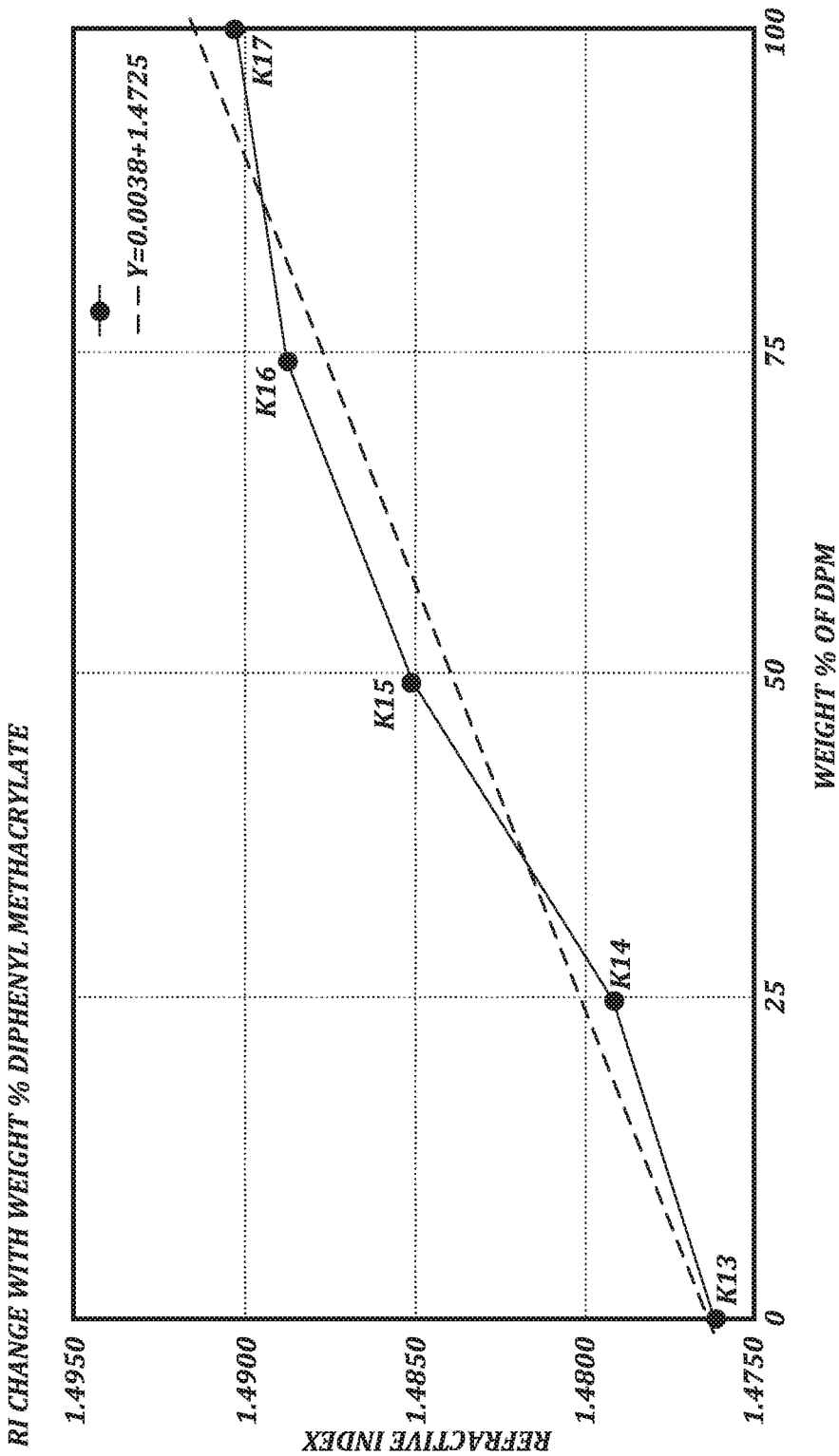
FIG. 6 is a graph illustrating the weight percentage of diphenyl methacrylate ("DPM") compared to the refractive index of an exemplary rigid polymer formed from the DPM.

FIG. 6 is a graph illustrating the weight percentage of diphenyl methacrylate ("DPM") compared to the refractive index for a series of exemplary rigid polymer formed from the DPM: K13-K17, as disclosed elsewhere herein. As the DPM weight percentage increases so does the refractive index. These results are across a band of refractive indices in the desirable range around 1.48, so as to match preferred liquid crystal ordinary refractive indices.

FIG. 7 is a table summarizing the composition of exemplary rigid polymers layer materials in accordance with embodiments disclosed herein.

Figure 8:
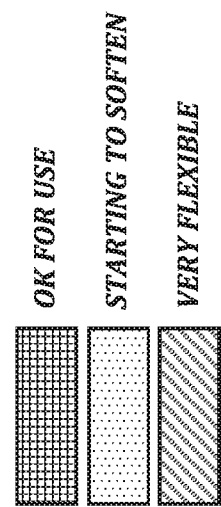
FIG. 8 is a table summarizing use temperature data for exemplary rigid polymers layer materials in accordance with embodiments disclosed herein.

FIG. 7 further discloses the softening point of the formulations. The softening point is defined according to ASTM D 1525 and ISO 306 and can roughly be equated to the materials' glass-transition temperature ($T_g$). For eye-mountable device applications, polymers with a higher softening point temperature are preferred. Accordingly, formulations K10 and K11 are noted as particularly high performers. Related FIG. 8 is a table summarizing use temperature data for exemplary rigid polymers layer materials in accordance with embodiments disclosed herein. Formulations K10 and K11 have similar temperature-related softness (still "ok for use" at 80° C.) to polyurethane. However, polyurethane has essentially no oxygen permeability, whereas K10 and K11 have sufficient oxygen permeability for use in eye-mountable devices according to the embodiments disclosed herein.

Referring to FIG. 9, mechanical testing of material softness was performed on a number of exemplary materials, as well as a comparative polyurethane. The data of FIG. 9 was generated as follows. Rigid contact lenses were cast in a contact lens mold that had a center thickness of 300 microns and a base curve of 8.4. The lenses were placed in a controlled-temperature oven with the convex surface facing upward and equilibrated for 30 minutes. At this point a probe was used to press on the dome of the convex side and it was noted if the material was still rigid, if softening was detected, or if the material easily deflected under the probe. More specifically, "Rigid" indicates no deflection of the material was noticed under probing; "Start Softening" indicates the material started to deform slightly under probing with a load at the center of the apex of the lens; and "Soft" indicates the material easily flattened when probed at the apex of the lens.

Collectively the data presented herein demonstrates that it is possible to formulate rigid, cast-moldable polymer device (lens) layers that have a relatively high softening point, similar to, or even superior to, comparative polyurethane materials, while also having oxygen permeability sufficient to allow a healthy environment for an eye on which such device layers are disposed above.

It should be understood that arrangements described herein are for purposes of example only. As such, those skilled in the art will appreciate that other arrangements and other elements (e.g., machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The invention claimed is:

1. An eye-mountable device, comprising
a first rigid polymer layer having a first-layer refractive index;
a second rigid polymer layer having a second-layer refractive index; and
a first liquid crystal layer between the first and second rigid polymer layers, wherein the first liquid crystal layer has an ordinary refractive index and an extraordinary refractive index,
wherein
the first-layer refractive index and the second-layer refractive index differ by less than 0.01,
the ordinary refractive index and the extraordinary refractive index differ by more than 0.1, and
the first-layer refractive index differs from either the ordinary refractive index or the extraordinary refractive index by less than 0.01,
the first rigid polymer layer or second rigid polymer layer comprise:
one or more di(meth)acrylate-derived monomeric unit; and
one or more (meth)acrylate-derived monomeric units, and
the first or second rigid polymer layer comprises 5 weight percent to 10 weight percent of a monomeric unit derived from Bisphenol A dimethacrylate, and 10 weight percent to 20 weight percent of a monomeric unit derived from methacryloxypropyl terminated polydimethylsiloxane 8-14 cSt.

2. The eye-mountable device of claim 1, wherein the first-layer refractive index differs from the ordinary refractive index by less than 0.01.

3. The eye-mountable device of claim 2, wherein the first-layer refractive index differs from the ordinary refractive index by less than 0.005.

4. The eye-mountable device of claim 2, wherein the first-layer refractive index differs from the ordinary refractive index by less than 0.001.

5. The eye-mountable device of claim 2, wherein the first-layer refractive index, second-layer refractive index and ordinary refractive index are between 1.40 and 1.55 measured at 589 nm.

6. The eye-mountable device of claim 2, wherein the first-layer refractive index, second-layer refractive index and ordinary refractive index are between 1.55 and 1.80 measured at 589 nm.

7. The eye-mountable device of claim 1, wherein the first-layer refractive index differs from the extraordinary refractive index by less than 0.01.

8. The eye-mountable device of claim 7, wherein the first-layer refractive index differs from the extraordinary refractive index by less than 0.005.

9. The eye-mountable device of claim 7, wherein the first-layer refractive index differs from the extraordinary refractive index by less than 0.001.

10. The eye-mountable device of claim 7, wherein the first-layer refractive index, second-layer refractive index and extraordinary refractive index are between 1.40 and 1.55 measured at 589 nm.

11. The eye-mountable device of claim 7, wherein the first-layer refractive index, second-layer refractive index and extraordinary refractive index are between 1.55 and 1.80 measured at 589 nm.

12. The eye-mountable device of claim 1, wherein the first or second rigid polymer layer comprises 20 weight percent to 30 weight percent of a monomeric unit derived from 1,1,1,3,3,3-Hexafluoroisopropyl methacrylate, 7 weight percent to 12 weight percent of a monomeric unit derived from methyl methacrylate, 10 weight percent to 20 weight percent of a monomeric unit derived from 3-[Tris(trimethylsiloxy)silyl]propyl methacrylate and 27 weight percent to 33 weight percent of a monomeric unit derived from o-phenylphenol ethyl acrylate.

13. The eye-mountable device of claim 1, wherein the first rigid polymer layer and second rigid polymer layer have a gas permeability of at least 100 Barrers.

14. The eye-mountable device of claim 1, further comprising a third rigid polymer layer having a third-layer refractive index and a second liquid crystal layer between the second rigid polymer layer and the third rigid polymer layer, wherein
the second liquid crystal layer has an ordinary refractive index and an extraordinary refractive index,
the second-layer refractive index and the third-layer refractive index differ by less than 0.01,
the ordinary refractive index and the extraordinary refractive index of the second liquid crystal layer differ by more than 0.1, and
the first-layer refractive index differs from either the ordinary refractive index or the extraordinary refractive index of the second liquid crystal layer by less than 0.01.

* * * * *